United States Patent [19]

Smith

[11] Patent Number: 5,024,596

[45] Date of Patent: Jun. 18, 1991

[54] INFRA-RED EQUIPMENT

[76] Inventor: Thomas M. Smith, 1415 Golf Rd., Cinnaminson, N.J. 08077

[21] Appl. No.: 771,722

[22] Filed: Sep. 3, 1985

Related U.S. Application Data

[63] Continuation-in-part of Ser. No. 752,908, Jul. 8, 1985, Pat. No. 4,604,054, Ser. No. 628,989, Jul. 9, 1984, Pat. No. 4,589,843, Ser. No. 592,793, Mar. 23, 1984, Pat. No. 4,654,000, Ser. No. 567,270, Dec. 30, 1983, abandoned, and Ser. No. 435,412, Oct. 20, 1982, abandoned, said Ser. No. 628,989, is a continuation-in-part of Ser. No. 509,161, Jun. 29, 1983, Pat. No. 4,500,283, said Ser. No. 592,793, is a continuation-in-part of Ser. No. 509,161, , Ser. No. 312,730, Oct. 19, 1981, Pat. No. 4,443,185, and Ser. No. 292,167, Aug. 11, 1981, Pat. No. 4,474,552, said Ser. No. 567,270, is a continuation-in-part of Ser. No. 509,161, , Ser. No. 312,730, , and Ser. No. 292,167, , said Ser. No. 435,412, is a continuation-in-part of Ser. No. 509,161, , Ser. No. 312,730, , Ser. No. 292,167, , Ser. No. 279,081, Jun. 30, 1981, Pat. No. 4,416,618, Ser. No. 238,418, Feb. 26, 1981, Pat. No. 4,447,205, Ser. No. 186,491, Sep. 12, 1980, Pat. No. 4,378,207, and Ser. No. 178,121, Aug. 14, 1980, Pat. No. 4,373,904, said Ser. No. 509,161, is a continuation-in-part of Ser. No. 312,730, , Ser. No. 292,167, , Ser. No. 279,081, , and Ser. No. 238,418, , said Ser. No. 312,730, is a continuation-in-part of Ser. No. 292,167, , Ser. No. 279,081, , Ser. No. 234,418, , Ser. No. 186,491.

[51] Int. Cl.⁵ .............................................. F23D 14/12
[52] U.S. Cl. .................................................. 431/328
[58] Field of Search ................ 431/328, 329, 278, 285

[56] References Cited

U.S. PATENT DOCUMENTS

| 3,188,366 | 6/1965 | Flynn . | |
|---|---|---|---|
| 3,407,024 | 10/1968 | Hirschberg et al. | 431/328 |
| 3,445,175 | 5/1969 | Krieger | 431/328 |
| 3,824,064 | 7/1974 | Bratko | 431/328 |
| 4,252,520 | 2/1981 | Bratko | 431/328 |
| 4,326,843 | 4/1982 | Smith | 431/328 |
| 4,416,618 | 11/1983 | Smith | 431/328 |

Primary Examiner—Carroll B. Dority
Attorney, Agent, or Firm—Connolly and Hutz

[57] ABSTRACT

Fibrous mat type burners with elongated mats can be packaged strapped together in pairs face-to-face and enclosed in telescoping carton halves that allow for packaging burners of different lengths. Mat edges can be impregnated to block escape of combustion mixture. Burners with hat-shaped mats for enveloping and brazing heat-exchange tubes to tube sheet can be used individually or in pairs to effect such brazing on tube-and-sheet assemblies secured on rotating table and indexed into position under burners. Substrates can be heated by gas-fired burners with or without the added heating effects of the hot combusted gases generated by the burners, and with or without the flushing effects of separate gas streams. Burners can have ceramic fiber mat held over shallow combustion mixture plenum essentially completely spanned by baffle. Mats can have folded-in edges to permit close packing. Plenum can have partition forming small ignition compartment with igniter against covering portion of mat.

3 Claims, 17 Drawing Sheets

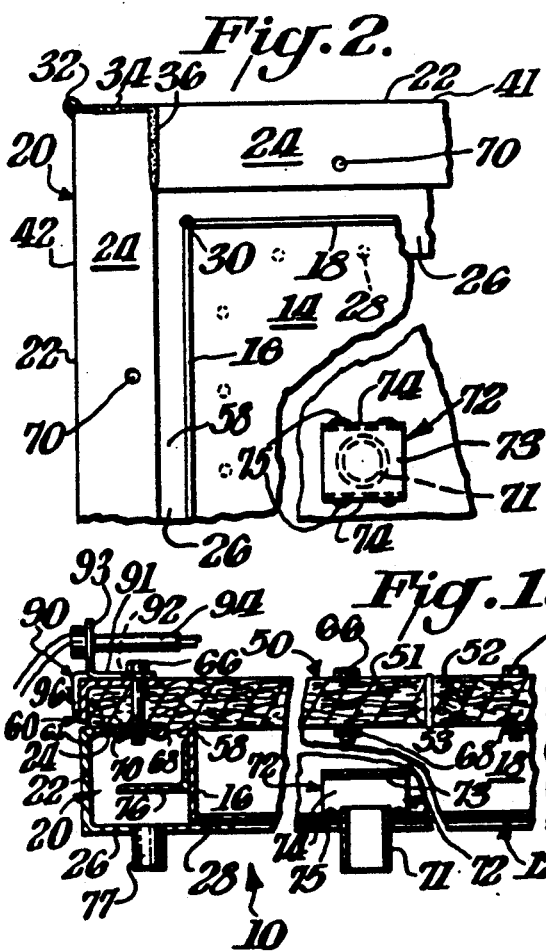
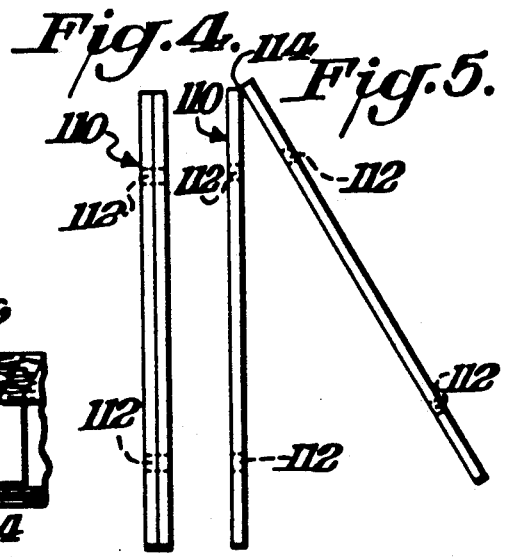
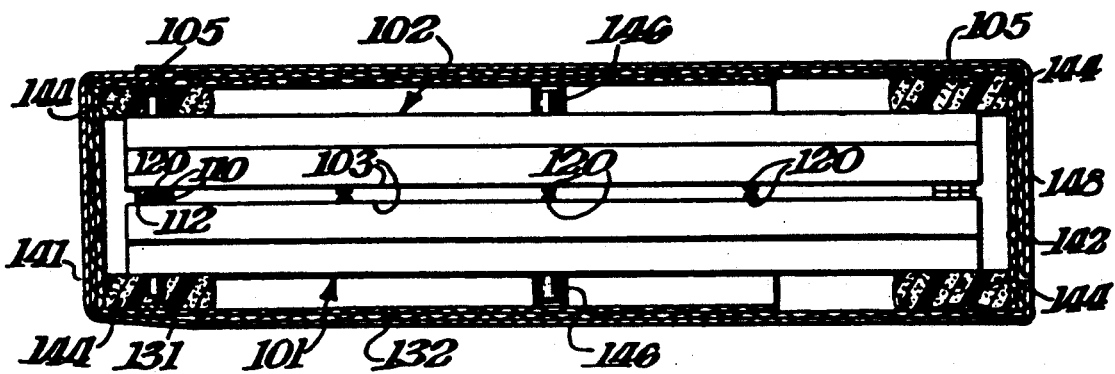

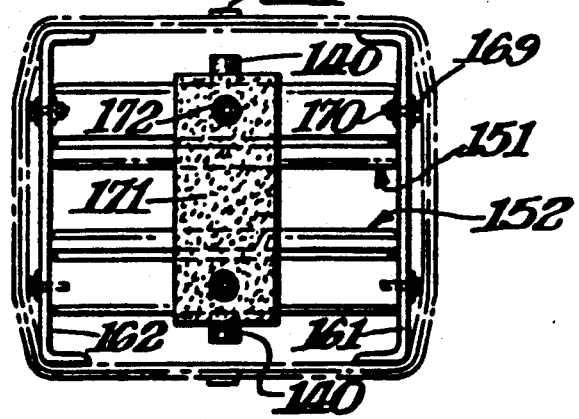
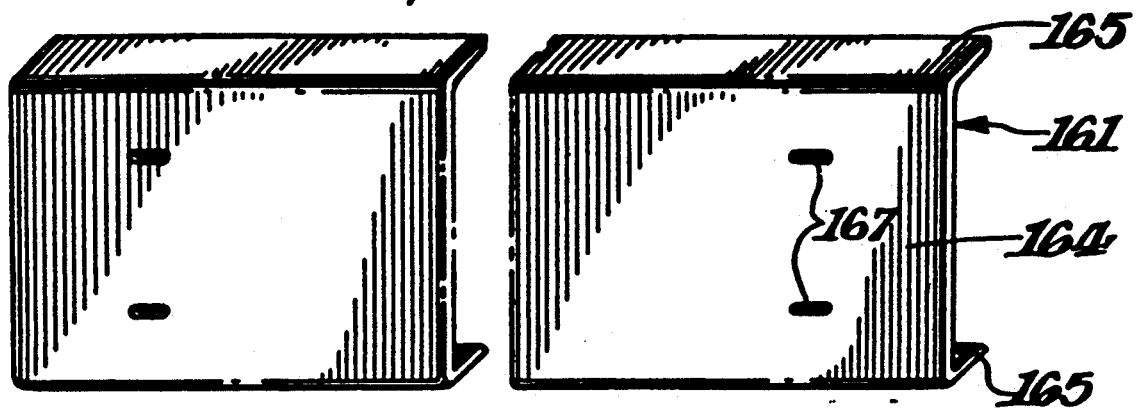

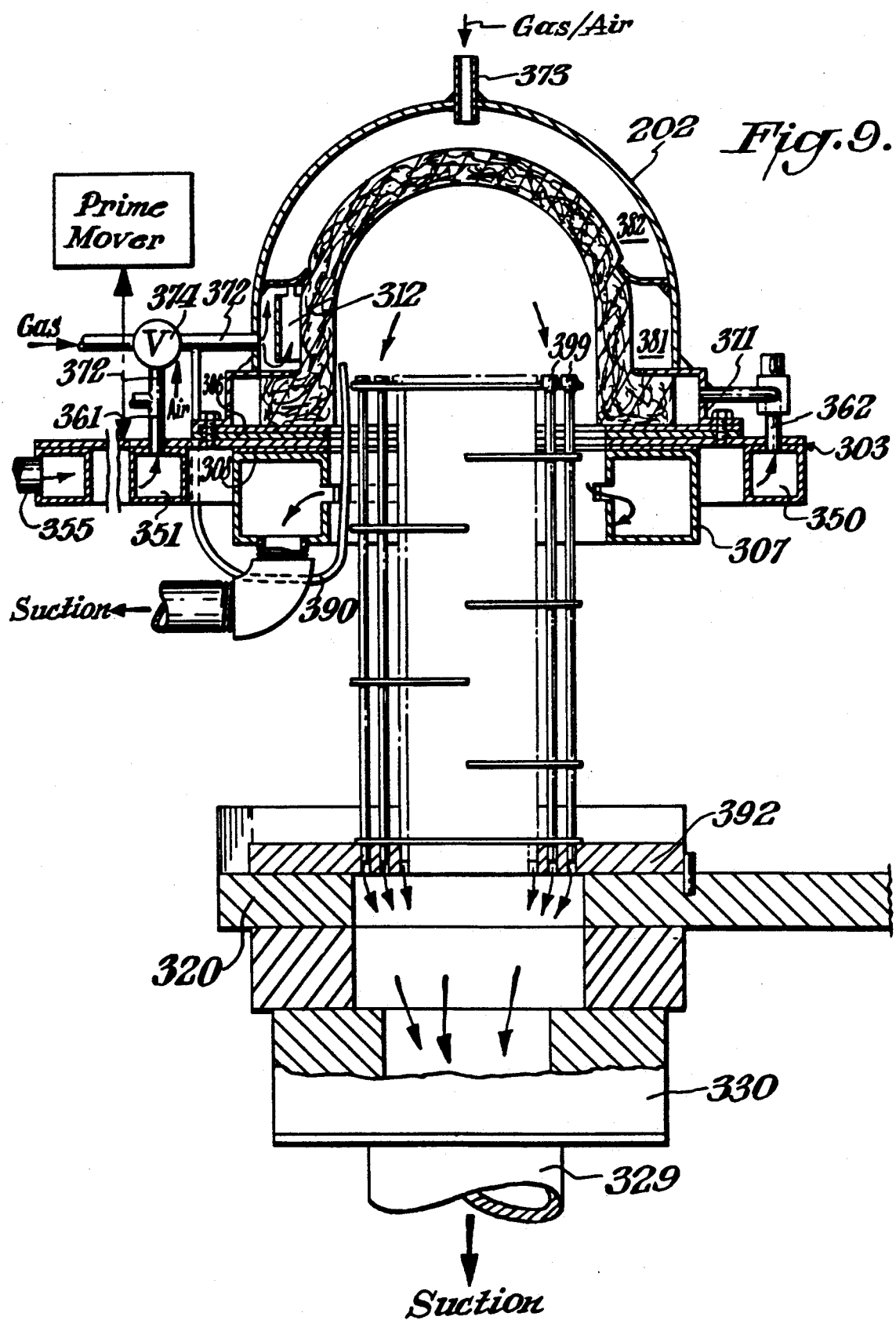

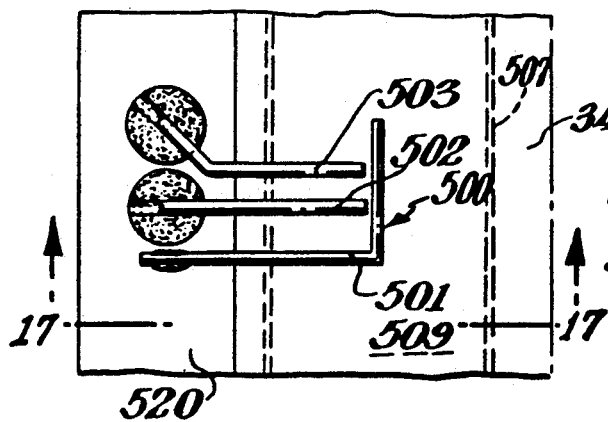
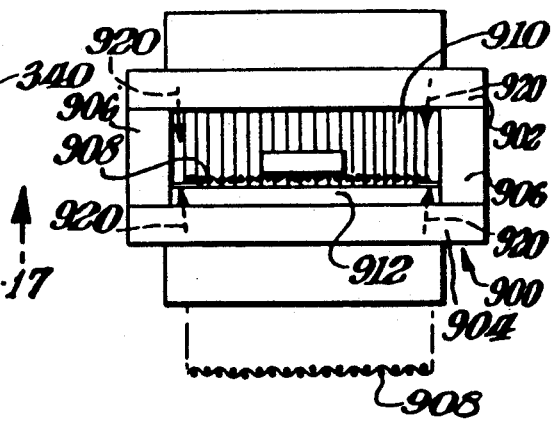
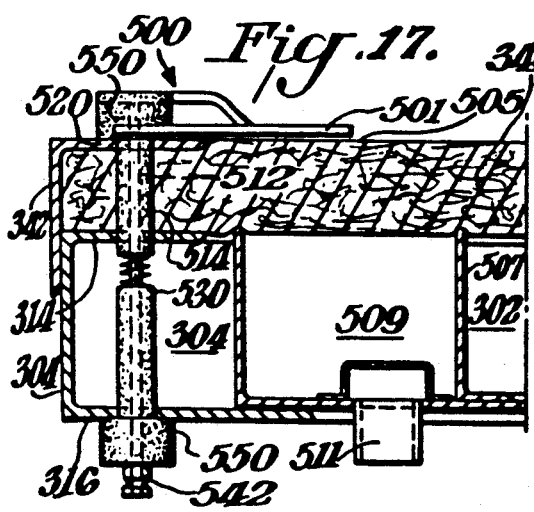
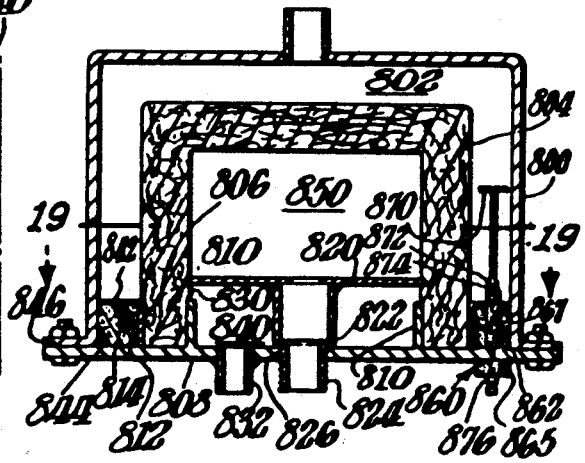
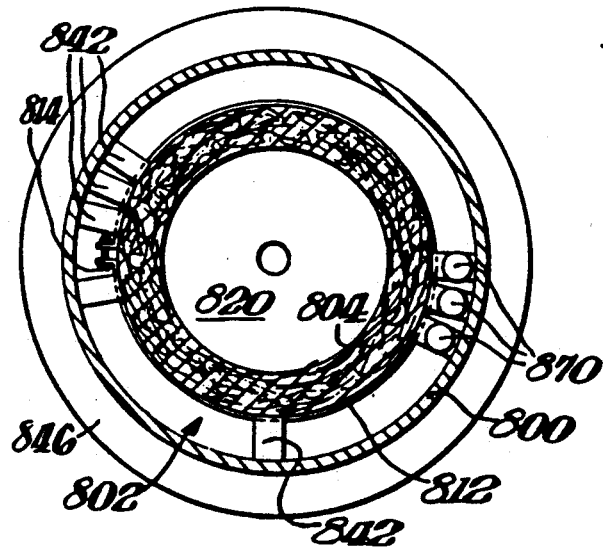

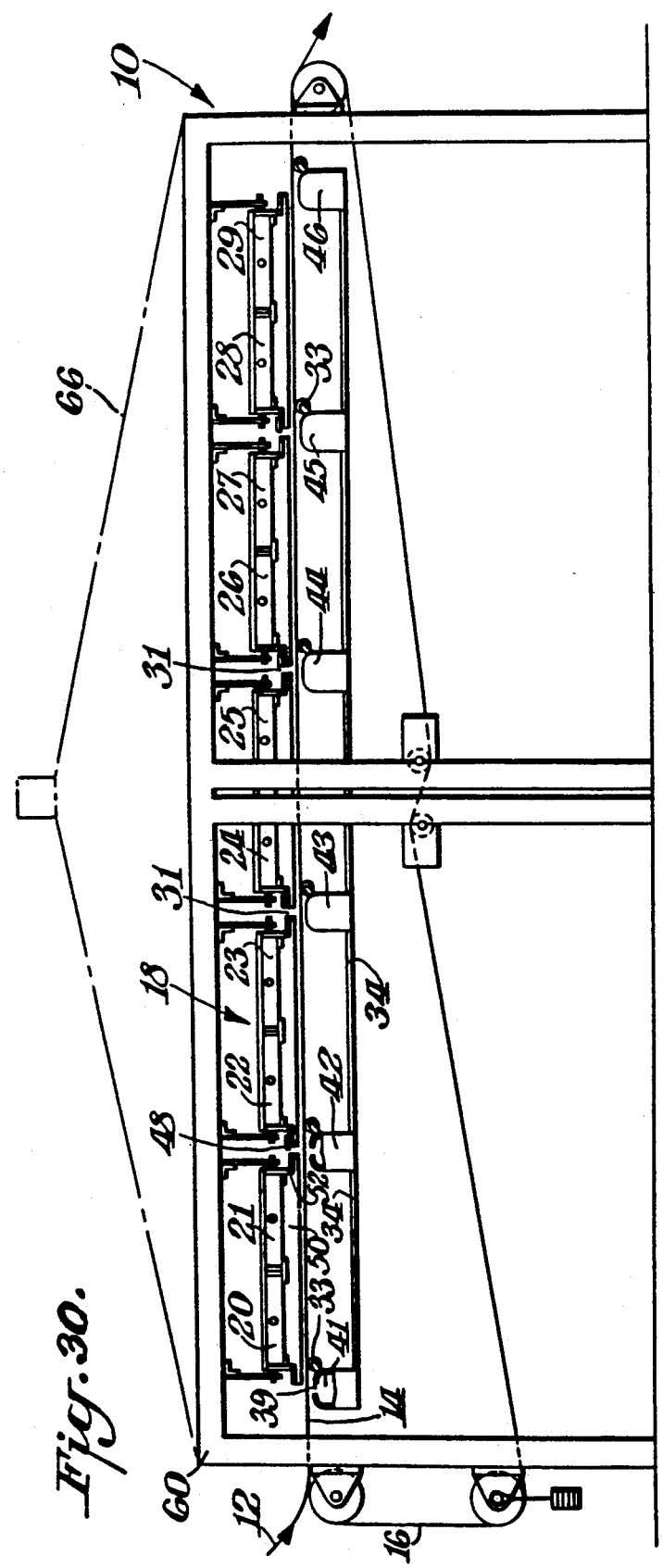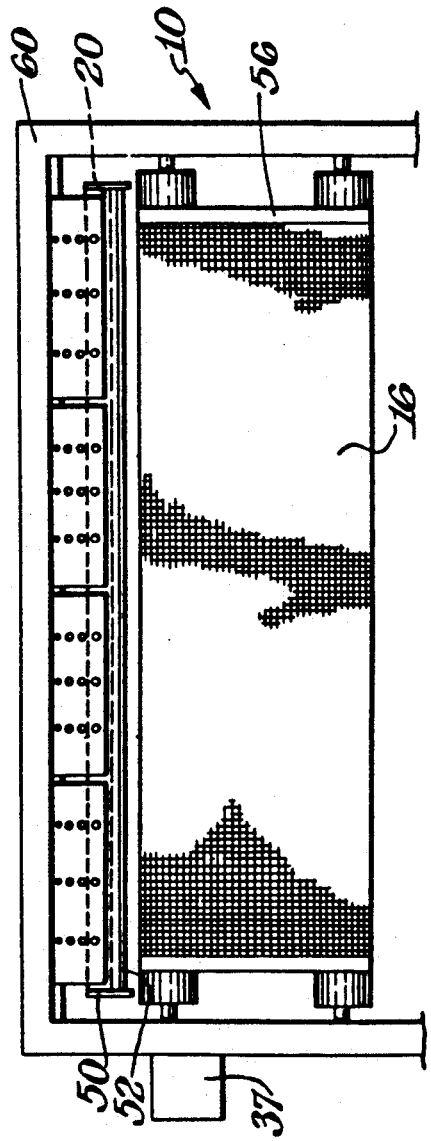

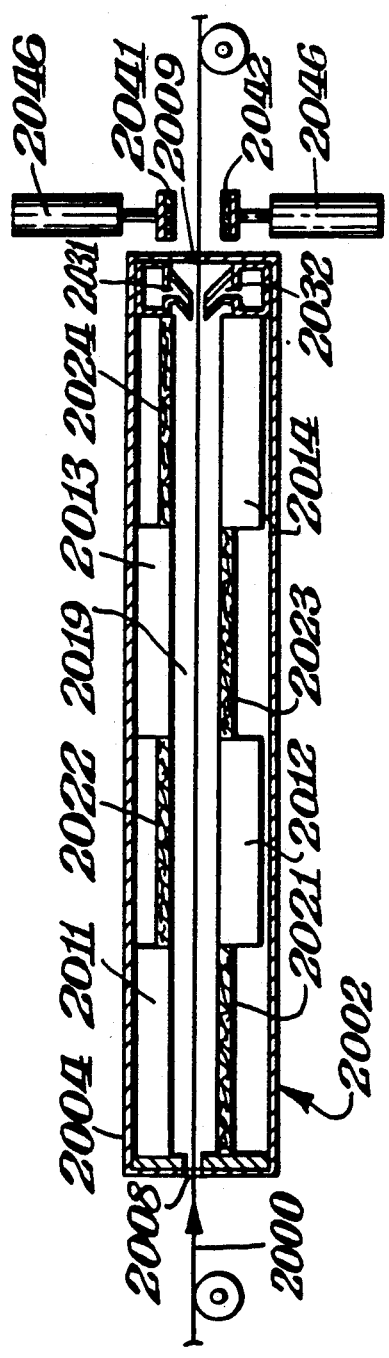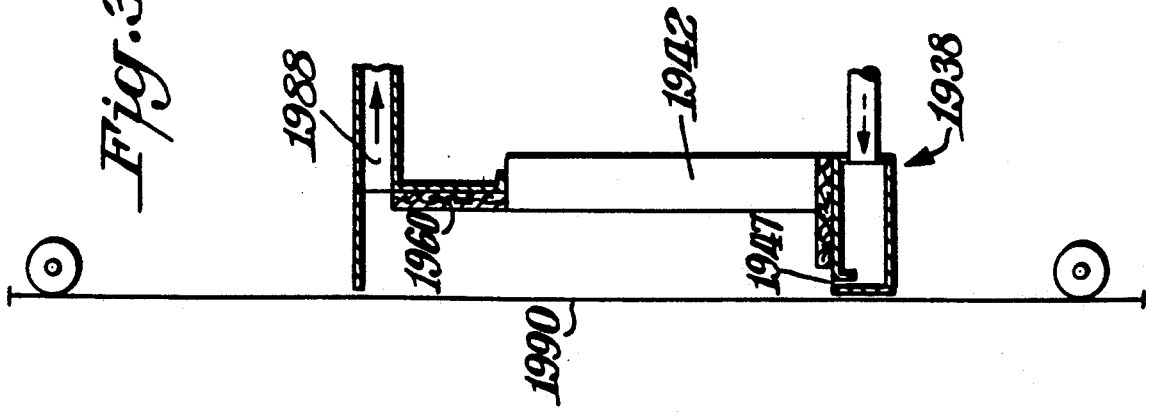

INFRA-RED EQUIPMENT

This application is a continuation-in-part of applications Ser. No. 752,908 filed July 8, 1985, now U.S. Pat. No. 4,604,054; Ser. No. 592,793 filed Mar. 23, 1984, now U.S. Pat. No. 4,654,000 Ser. No. 628,989 filed July 9, 1984 U.S. Pat. No. 4,589,843 granted May 20, 1986; Ser. No. 567,270 filed Dec. 30, 1983, and Ser. No. 435,412 filed Oct. 20, 1982 (subsequently abandoned). These earlier applications are direct or indirect continuations-in-part of the following additional applications as set forth:

Ser. No. 592,793 is a continuation-in-part of
  (1) application Ser. No. 292,167 filed 8/11/81 (U.S. Pat. No. 4,474,552).
  (2) application Ser. No. 312,730 filed 10/19/81 (U.S. Pat. No. 4,443,185)
  (3) application Ser. No. 509,161 filed 6/29/83 (U.S. Pat. No. 4,500,283)

Ser. No. 628,929 is a continuation-in-part of application Ser. No. 509,161.

Ser. No. 567,270 is a continuation-in-part of
  (1) application Ser. No. 509,161
  (2) application Ser. No. 312,730
  (3) application Ser. No. 292,167

Ser. No. 435,412 is a continuation-in-part of
  (1) application Ser. No. 509,161
  (2) application Ser. No. 312,730
  (3) application Ser. No. 292,167
  (4) application Ser. No. 279,081 filed 06/30/81 (U.S. Pat. No. 4,416,618)
  (5) application Ser. No. 238,418 filed 2/26/81 (U.S. Pat. No. 4,447,205)
  (6) application Ser. No. 186,491 filed 9/12/80 (U.S. Pat. No. 4,378,207)
  (7) application Ser. No. 178,121 filed 8/14/80 (U.S. Pat. No. 4,373,904)

Ser. No. 509,161 is a continuation-in-part of
  (1) application Ser. No. 312,730
  (2) application Ser. No. 292,167
  (3) application Ser. No. 279,081
  (4) application Ser. No. 238,418

Ser. No. 312,730 is a continuation-in-part of
  (1) application Ser. No. 292,167
  (2) application Ser. No. 279,081
  (3) application Ser. No. 234,418
  (4) application Ser. No. 186,491
  (5) application Ser. No. 178,121

Ser. No. 292,167 is a continuation-in-part of
  (1) application Ser. No. 279,081
  (2) application Ser. No. 238,418
  (3) application Ser. No. 186,491
  (4) application Ser. No. 178,121

Ser. No. 279,081 is a continuation-in-part of
  (1) application Ser. No. 238,418
  (2) application Ser. No. 186,491
  (3) application Ser. No. 178,127
  (4) application Ser. No. 20,079 filed 3/9/79 (U.S. Pat. No. 4,290,746)
  (5) application Ser. No. 952,332 filed 10/18/78 (U.S. Pat. No. 4,326,843)

Ser. No. 238,418 is a continuation-in-part of
  (1) application Ser. No. 186,491
  (2) application Ser. No. 178,121
  (3) application Ser. No. 94,901 filed 11/16/79 (U.S. Pat. No. 4,272,238)
  (4) application Ser. No. 20,079
  (5) application Ser. No. 952,332
  (6) application Ser. No. 775,838 filed 3/9/77 (U.S. Pat. No. 4,272,237)

Ser. No. 186,491 is a continuation-in-part of
  (1) application Ser. No. 178,121
  (2) application Ser. No. 94,901
  (3) application Ser. No. 20,079
  (4) application Ser. No. 952,332
  (5) application Ser. No. 863,251 filed 12/22/77 (U.S. Pat. No. 4,224,018)
  (6) application Ser. No. 775,838

Ser. No. 178,121 is a continuation-in-part of
  (1) application Ser. No. 94,901
  (2) application Ser. No. 20,079
  (3) application Ser. No. 952,332
  (4) application Ser. No. 863,251
  (5) application Ser. No. 775,838

Ser. No. 94,901 is a continuation-in-part of
  (1) application Ser. No. 20,079
  (2) application Ser. No. 952,332
  (3) application Ser. No. 863,251
  (4) application Ser. No. 775,838

Ser. No. 20,079 is a continuation-in-part of
  (1) application Ser. No. 952,332
  (2) application Ser. No. 906,229 filed 5/15/78 (U.S. Pat. No. 4,157,155)
  (3) application Ser. No. 863,251
  (4) application Ser. No. 775,838

Ser. No. 952,332 is a continuation-in-part of
  (1) application Ser. No. 906,229
  (2) application Ser. No. 863,251
  (3) application Ser. No. 775,838

Ser. No. 906,229 is a continuation-in-part of
  (1) application Ser. No. 863,251
  (2) application Ser. No. 775,838

Ser. No. 863,251 is a continuation-in-part of
  (1) application Ser. No. 775,838
  (2) application Ser. No. 701,687 filed 7/1/76, subsequently abandoned Ser. No. 775,838 is a continuation-in-part of application Ser. No. 701,687.

The present invention is related to apparatus for generating infra-red radiation, and the manufacture and use of such apparatus.

Among the objects of the present invention is the provision of improved apparatus for generating and using infra-red radiation.

Additional objects of the present invention include the provision of novel packaging arrangements for such apparatus.

The foregoing as well as additional objects of the present invention will be clear from the following description of several of its exemplifications, reference being made to the accompanying drawings wherein:

FIG. 1 is a sectional view of one form of infra-red generator or burner according to the present invention;

FIG. 2 is a plan view of a corner detail of the burner of FIG. 1, with the upper members removed;

FIG. 3 is a view similar to that of FIG. 1 showing two infra-red generators packaged for shipment;

FIG. 3A is a transverse sectional view of a modified burner package assembly typifying the present invention;

FIG. 3B is an isometric view of a clamping member in the assembly of FIG. 3A;

FIG. 4 is a side view of a packaging strip in the packaging arrangement of FIG. 3;

FIG. 5 is a side view of the packaging strip of FIG. 4, showing the strip partly unfolded;

FIG. 9 is a sectional view of the machine of FIG. 8, showing details of its infra-red generating and utilizing construction;

FIG. 16 is a broken-away plan view of a portion of a heater showing a detail feature suitable for use according to the present invention;

FIG. 17 is a sectional view of the construction of FIG. 16, taken along line 10—10;

FIG. 18 is a sectional view of a novel heat exchanger incorporating a ceramic fiber heater and illustrative of the present invention;

FIG. 19 is a sectional view of the burner of FIG. 18, taken along line 19—19;

FIG. 20 illustrates an enclosed burner construction of the present invention;

Figure 21:
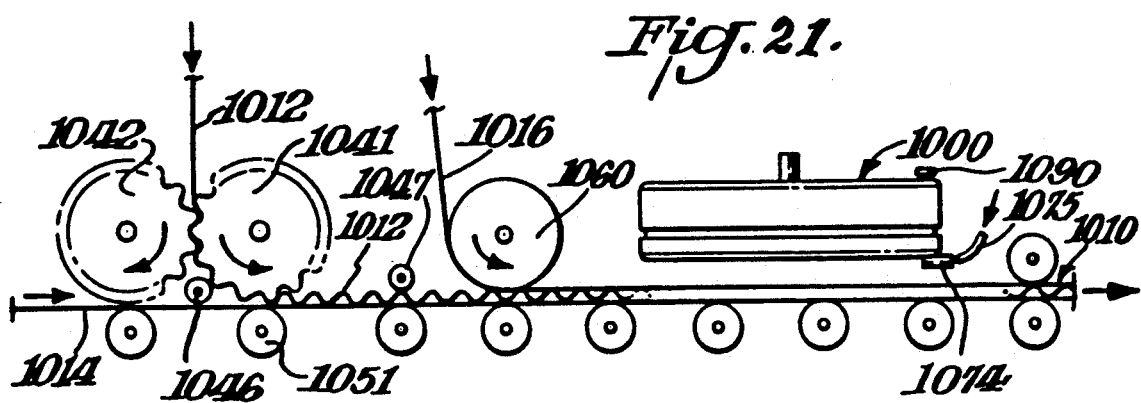
Figure 22:
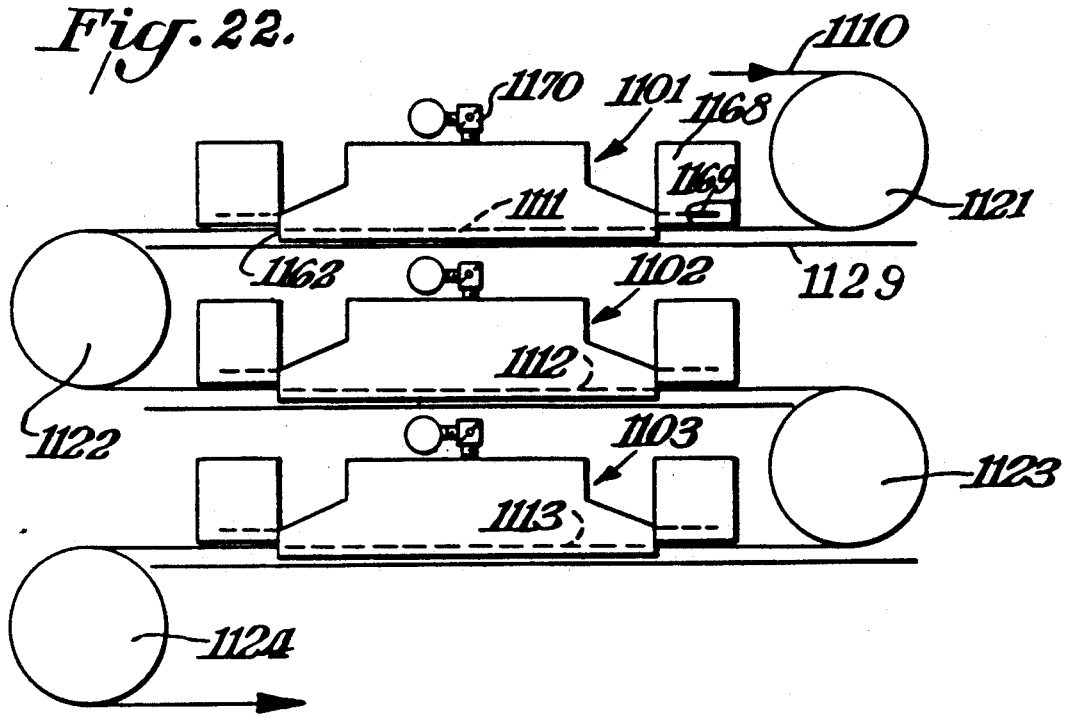
Figure 23:
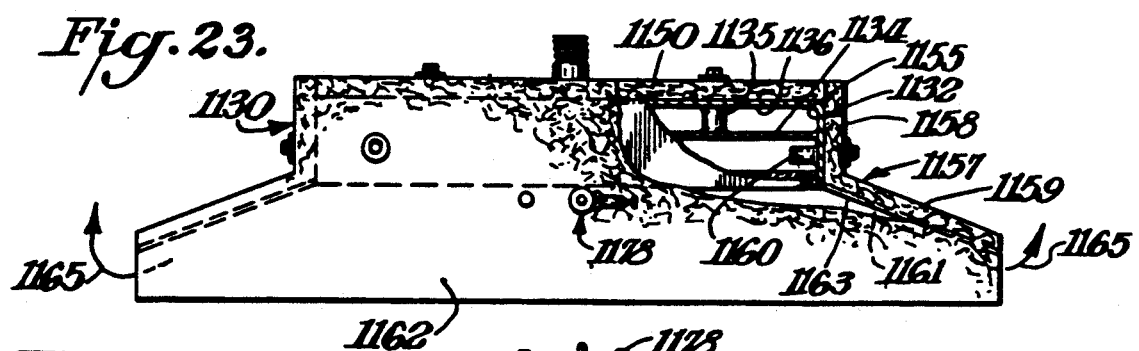
Figure 24:
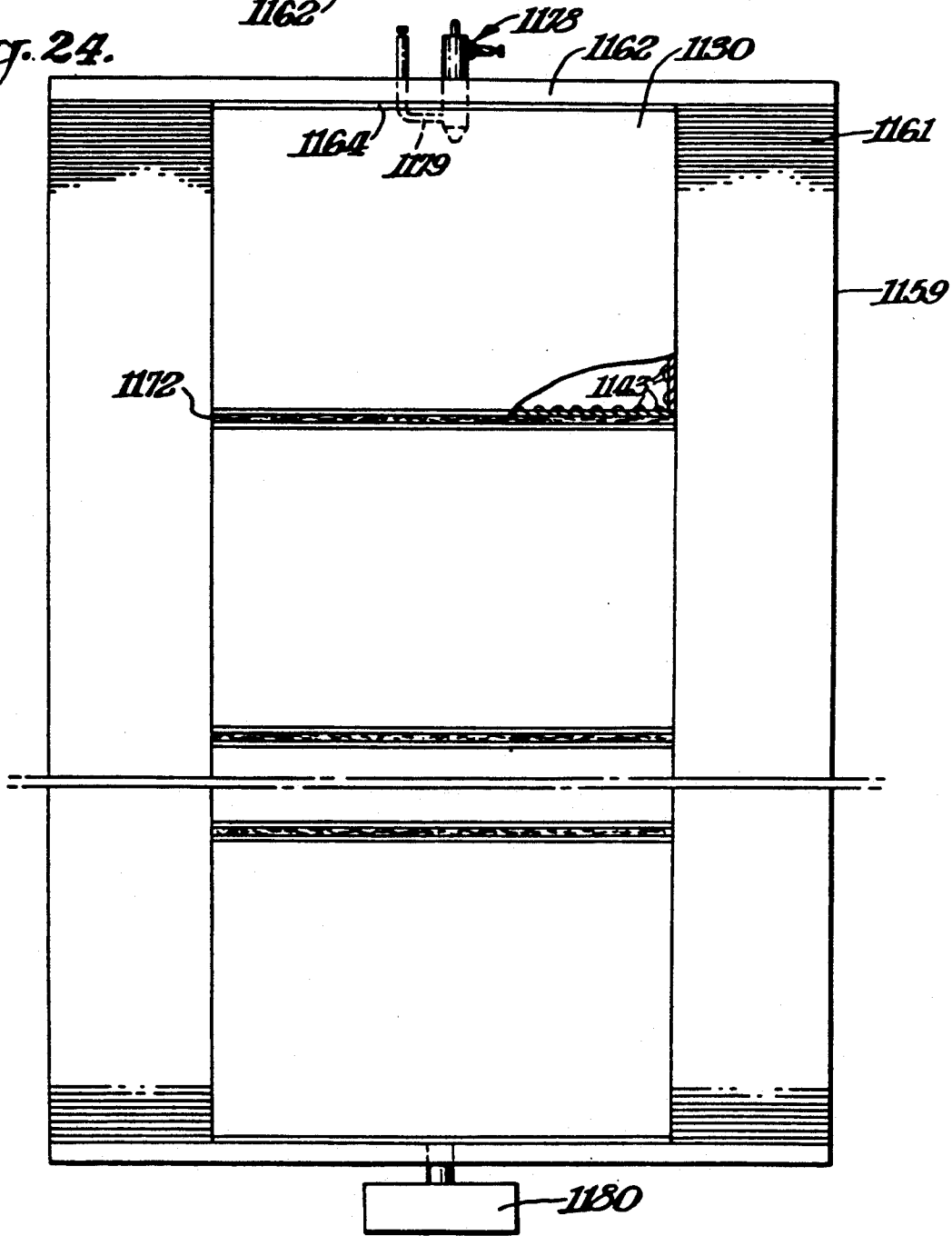
Figure 32:
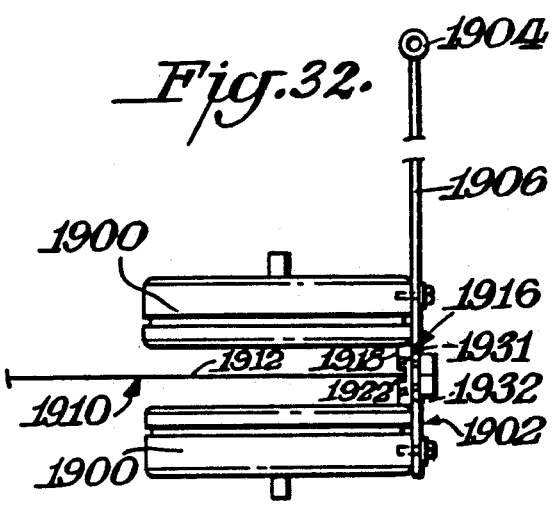
Figure 28:
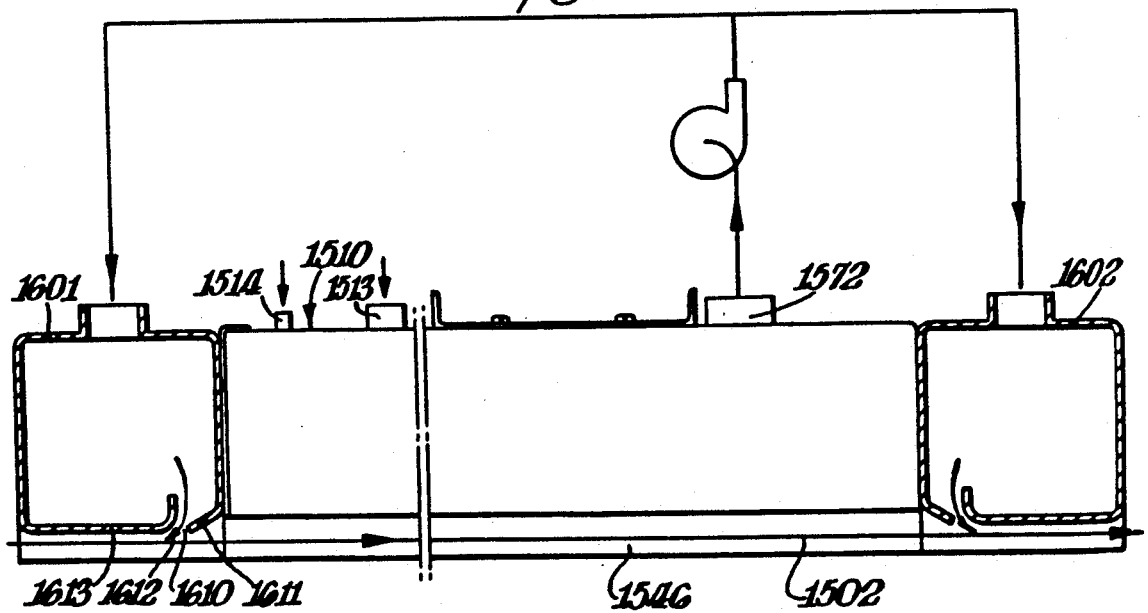
Figure 29:
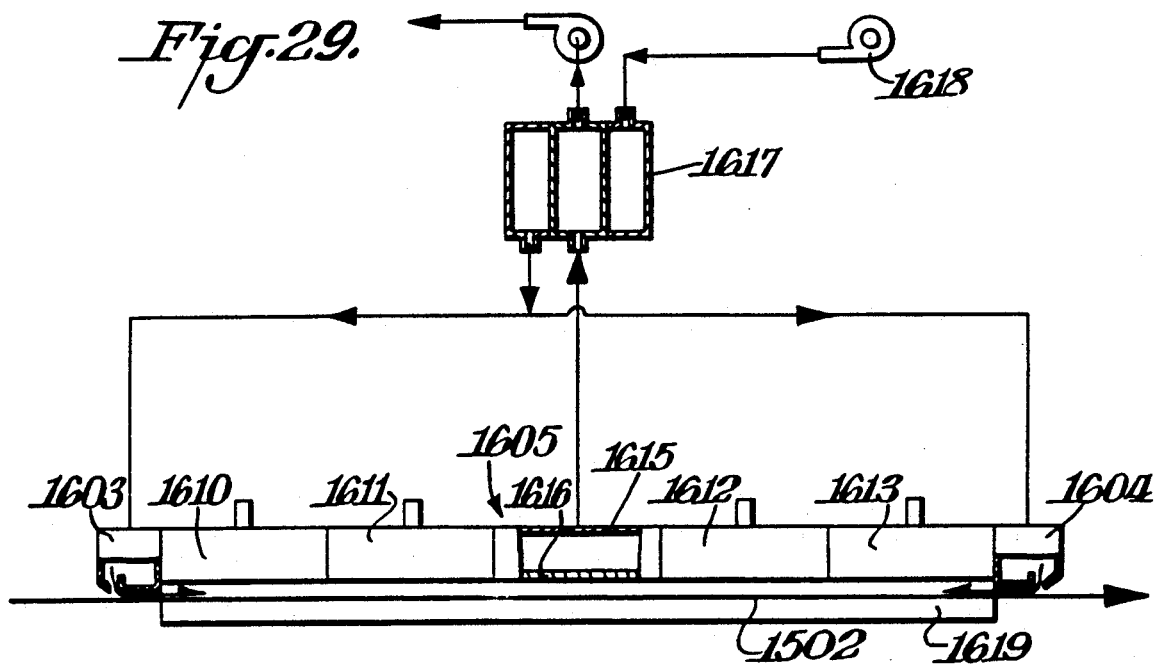
Figure 34:
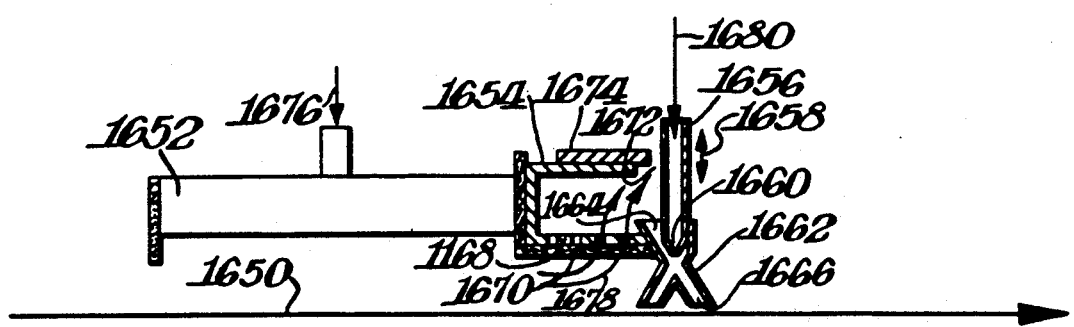
Figure 35:
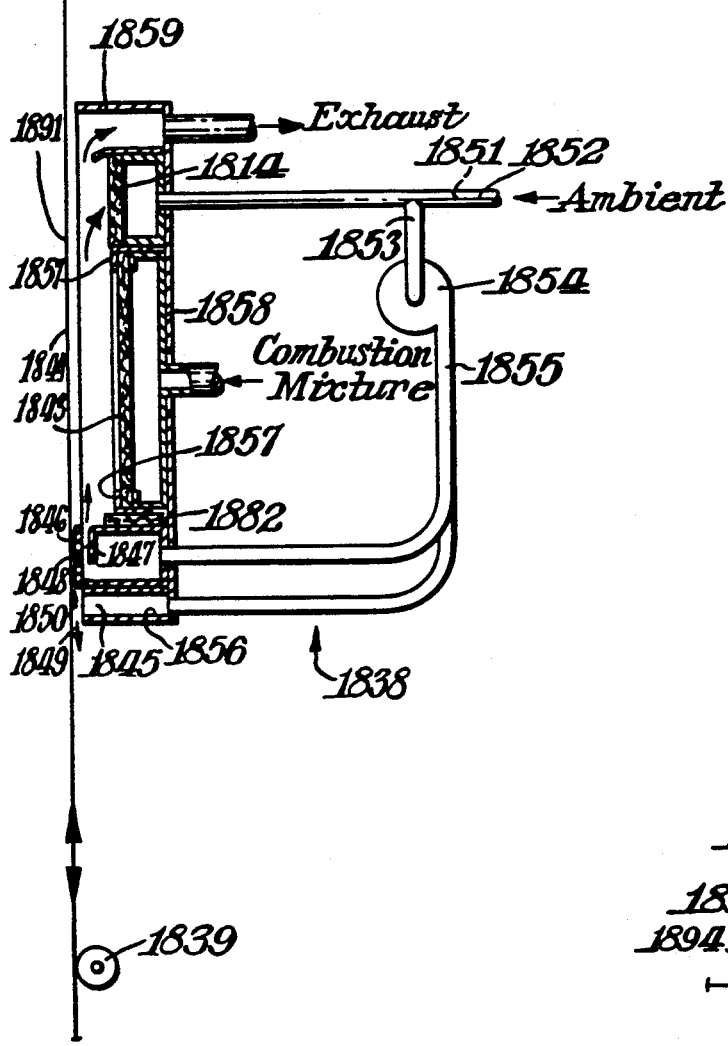
Figure 36:
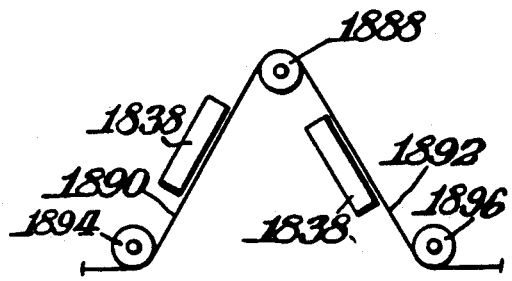

FIG. 21 schematically illustrates the making of corrugated board pursuant to the present invention;

FIG. 22 is a schematic side view of further embodiments of the present invention;

FIG. 23 is a detailed side view with parts broken away, of a burner in the construction of FIG. 22;

FIG. 24 is a view of the burner construction of FIG. 23, taken from the face of the burner;

FIGS. 25, 26, 27 and 33 are schematic side views of additional heating apparatus typical of the present invention;

FIG. 28 is a partly sectional view of a variation of the FIG. 1 apparatus, modified for use in heat-treating webs;

FIG. 29 is a somewhat diagrammatic view of a further modified heating apparatus of the present invention;

FIG. 30 is a side view of yet another web-heating apparatus incorporating the present invention;

FIG. 31 is a view of the apparatus of FIG. 30, taken from its inlet end;

FIG. 32 is a front view of an apparatus for irradiating the edges of sheets in accordance with the present invention;

FIG. 34 is a partly detailed side view of a modified embodiment of the apparatus of FIG. 30;

FIG. 35 is a somewhat diagrammatic sectional view of a further modified embodiment;

FIGS. 36, 37 and 38 are very schematic side views of variations of the embodiment of FIG. 35.

Figure 39:
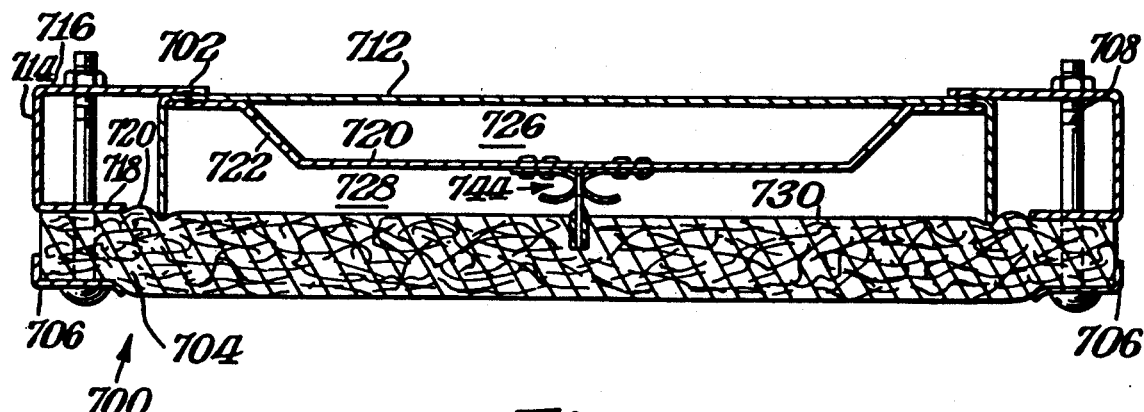
Figure 40:
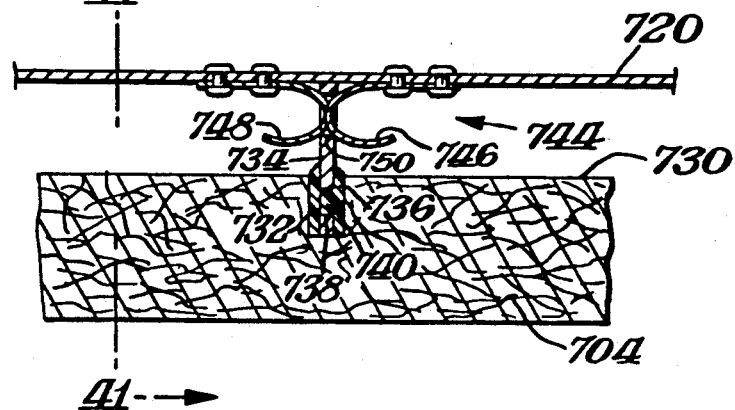

FIG. 39 is a vertical sectional view of a downwardly firing burner with a specially re-enforced matrix;

FIG. 40 is an enlarged detail view of the reenforcement of FIG. 39; and

Figure 41:
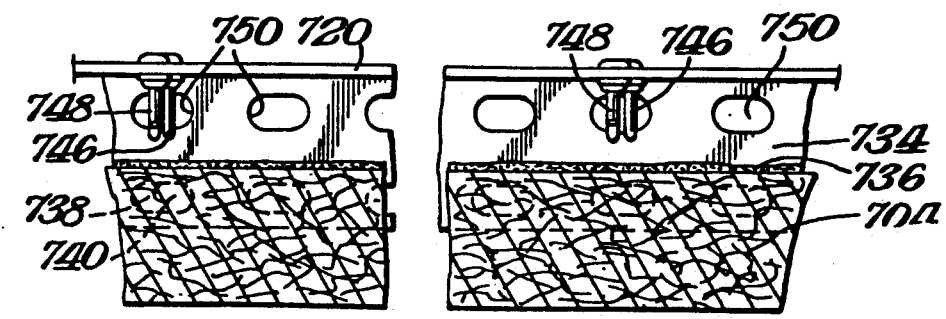

FIG. 41 is a side view of the interior of FIG. 40, looking from line 41—41.

The infra-red generators of the present invention have a felted fiber matrix pad with extended surfaces and at least about ⅛ inch thick, through which pad a gaseous combustion mixture is passed to emerge from one surface and to burn at that surface to heat that surface to incandescence and thus generate infra-red energy. Generators of this type are described in the above-noted parent applications and patents.

The matrix pad for a generator of the foregoing type can consist of at least two separate pieces of matrix butted together in edge-to-edge contact, the abutting edge faces being adhered to each other with a layer of silicone rubber not more than about 3 millimeters thick.

In such a cemented-together matrix pad it is preferred that the pad have its edges clamped in place in the generator, with each separate matrix piece extending to at least one of said edges.

Packaging of elongated burners having matrix pads so long that they are most readily made of adherently united matrix pieces, is greatly simplified by using telescopic packaging cartons. This is particularly desirable when burners of different lengths are being manufactured and are to be packaged for shipment.

According to this aspect of the present invention, two burners are clamped together in parallel with their front faces face-to-face, a first protective tubular carton closely fitted around the strapped-together burners, one end of the tubular carton being open, the other end being closed, another protective tubular carton telescoped over the first tubular carton and also having one end open the other end being closed, the tubular cartons facing in opposite directions and strapped together with their closed ends as the ends of the packaging combination.

Cushioning strip means can be sandwiched between the front faces of the strapped-together burners. Where the front faces of the burners have projecting fastener heads, such as of screws or the like, the cushioning strips used for the packaging are preferably perforated to receive the projecting heads, and thick enough to keep apart the faces and fastener heads of the strapped-together burners. Such cushioning strips are conveniently made of folded-over lengths of corrugated cardboard, but are not needed where the burners are clamped together so that they are held in spaced-apart relation.

A further aspect of the present invention involves an automatic apparatus using a radiant heater to seal heat-exchange tubes into tube sheets, as described in application Ser. No. 701,687 (abandoned).

According to the present invention such an apparatus contains a rotatable table having at least two indexing stations in its rotational path, and support means for holding an assembly of tubes and a tube sheet at each indexing station with the tubes positioned vertically, a radiant heater mounted over one indexing station and connected for automatic lowering and raising to surround the uppermost portion of the tube-and-sheet assembly at that station when the heater is lowered and to clear the tube-and-sheet assembly when the heater is raised, and a suction head movable between (a) a position under an in suction engagement with the tube-andsheet assembly at the heater station and (b) a position that clears the table.

In the foregoing apparatus it is helpful to have the heater gas-fired, and to have a suction intake connected to draw off some of the gaseous combustion products from around the lower periphery of the heater.

A particularly simple movable suction connection can also be used for the suction head that is brought into and out of position below the tube-and-sheet assembly on the table. Thus, the suction head can be carried by a suction pipe connected through a loose pipe connection to a suction source, the head being oriented for movement between positions (a) and (b) by rotation of the pipe around its axis, so that the loose pipe connection swivels to permit such head movement and also permits a small leakage into the suction source. This simplifies the use of a single source of suction connected to both the lower portion of the heater and the suction head below the table.

Another desirable feature pursuant to the present invention, is the use of two side-by-side heaters at the heating station of the automatic apparatus, to seal two side-by-side tube-and-sheet assemblies at one time.

Turning now to the drawings, the burner 10 of FIG. 1 has an elongated metal plenum trough 12 whose floor is shown at 14 and side walls at 16, 18. The floor can be -by 120 inches in size, by way of example, with side walls 16 then 14 inches long, and side walls 18 120 inches long. The heights of the side walls need only be about 2½ inches or even as little as 1⅜ inches.

Around the periphery of the plenum trough 12 is secured a metal air-seal channel 20 having a web 22 and unequal flanges 24, 26. As illustrated flange 26 is longer than flange 24 and is spot welded by a series of spots, as at 28, to the bottom of plenum trough floor 14.

The corners of the plenum trough and of the air-seal channel are welded together as shown for illustrative purposes in FIG. 2. Weld 30 is a gas-tight joint between side walls 16 and 18. At the burner corner where air-seal webs 22 meet, a vertical weld 32 joins these webs, and additional welds 34, 36 join the flanges 24 together, and while these three welds can also be gas-tight, this is not essential.

The corner construction of the air-seal channel 20 as illustrated in FIG. 2 is made by notching out a square section of web 24 at the end of one rail 41 of the channel, and fitting the un-notched end of the adjacent rail 42 into place. The other flanges 26 of the channel rails can be similarly formed and assembled.

In many cases it is advantageous to use the corner construction of FIG. 2 because square notching can be performed more accurately than mitered notching as shown in U.S. Pat. No. 4,035,132. The product of FIG. 2 will then be simpler to weld together, even though a little extra welding is needed, and will present a better appearance. It is not necessary to weld or otherwise join together the flanges 24, 24 at a corner of the burner body. Indeed by providing a gap between these flanges at those locations the matrix-covering flange of the hold-down frame 20 is better permitted to undergo thermal expansion when the burner is in use, with less warpage of the frame. A similar technique for reducing warpage is shown in U.S. Pat. No. 3,824,064.

If desired the side walls 16, 18 of the plenum trough can have their upper edges provided with a short horizontally extending lip as shown in U.S. Pat. No. 4,035,132, in which event the lip can have a corner construction corresponding to that of the air-seal rail flanges.

Burner 10 has a porous matrix pad 50 positioned over the flanges 24 and upper edges of side walls 16, 18. The matrix pad is clamped in place by a rectangular hold-down frame 60 that extends around the periphery of the pad and is secured to flanges 24 by a series of attaching screws 66. These screws can be threadedly engaged in spring clips 68 fitted over holes 70 in the flanges 24, or in nuts held in these holds by nut-holding clips or the like.

Frame 60 is provided with screw-receiving holes aligned with holes 70, and the screws are drawn up tightly enough to compress the matrix edges as described in Ser. No. 775,838 U.S. Pat. No. 4,272,237, and substantially reduce the porosity of those edges. The matrix pad is preferably of self-supporting although somewhat resilient construction about an inch or 1⅛ inches thick with its edges compressed down to about 90% of its uncompressed thickness. The frame can have a notched corner construction similar to that of the air-seal rails shown in FIG. 2.

Because of the length of the burner, the matrix pad is made up of two pieces 51, 52, adherently united by a thin layer 53 of silicone rubber sealant. The joint is a simple butt joint and the adhesive layer thickness no greater than about 3 millimeters. The sealent is non-porous, but such a thin layer of sealant blocks off only a small and inconsequential portion of the face of the matrix pad. As a result the slight gap in the area over which the gaseous combustion mixture burns at the outer face of the pad, is of no consequence.

In use the incandescent condition of the surface fibers of the mat on both sides of the sealant layers 53 will cause the outermost portion of that layer to also get very hot and can partially decompose that portion. However, the movement of the cool combustion mixture through the inner fibers of the matrix keeps them cool and also keeps the inner portion of the thin sealant layer cool. Thicker sealant layers are not kept so cool and show more thermal degradation. With the 3 millimeter thickness, the adhesive joint need only be about ½ inch deep to have a useful life of many months of operation. Best results are obtained with the adhesive extending the entire depth of the matrix.

The foregoing butt joint is much simpler to make than the tongue-and-groove joint used in the prior art with a sodium silicate type of adhesive deposited from aqueous solution. That prior art type of joint is actually more porous than the adjacent portions of the matrix, and tends to make the generation of infra-red energy much less uniform.

The butt joint can also be modified by connecting together two matrix lengths with the help of a metal foil both faces of which are coated with a thin layer of sealant such as silicone rubber. The overall thickness of the double-coated foil should also be not more than about 3 millimeters, even when the foil is a good heat conductor like aluminum. Some of the foil, with or without coating on it, can be permitted to project into the plenum, but there should be no projection beyond the outer face of the matrix.

As in the constructions of the parent applications, the burner 10 is provided with connection nipples to supply the plenum with combustion mixture and to supply air to the interior of the air-seal channels. A nipple 71 for the plenum is shown as welded into trough floor 15 and a simple deflector baffle 72 welded above it to the inner face of that floor. That baffle is a short length of a channel that has only a body web 73 and two flanges 74, and is very simply tack welded as at locations 75, to the trough floor 14. If desired the baffle can be further simplified, as by making it a metal tab much like the bent tab baffle 76 shown for the air nipple 77, but having the bending angle an obtuse angle. One tab of such baffle can then be spot welded to the top of trough floor 14 alongside the nipple 71, to hold the remainder of the baffle at an angle over that nipple, More than one combustion mixture supply nipple is used with burners as large as 120 inches. Two such nipples are enough, however, especially if symmetrically located about 60 inches apart along the burner's length, when the plenum is not partitioned into separate compartments. The plenum can be easily partitioned as by welding a sheet metal panel 81 in place in the trough, in which event there should be at least one combusion mixture supply nipple for each plenum compartment.

Panel 81 preferably does not extend into the air-seal channel, and it is not necessary to partition off the air seal, although this can be done as by a similar partition panel, if desired. The air-seal slot 58 by which air is discharged from the air-seal channel through the entire margin of the matrix pad, is preferably kept unobstructed. A gas-tight seal can be provided between partition panel 81 and the walls and floor of the plenum trough, but a simple spot welding is enough if the combustion mixture supply nipples are connected to gas and air sources arranged to supply only air to any plenum compartment that is not being fired while an adjacent compartment is being fired. The air pressure in the unfired compartment can then be made equal to or a little greater than the combustion mixture pressure in the fired compartment, to reduce the danger of combustion mixture leakage around the partition.

For some uses of the burners, they are arranged to generate infra-red energy over a variable length. Thus, in the pre-drying of a web fabric in a textile mill, the fabric processed can sometimes be as narrow as 30 inches or so, and sometimes as wide as 120 inches. The burners can then be partitioned as for example to provide a central plenum compartment 30 inches long, plenum compartments 20 inches long on either side of the central compartment, and plenum compartments 25 inches long at each end of the plenum. The appropriate compartments can then be fired to match the width of the fabric that is passed transversely in front of the burner for exposure to the infra-red energy.

It is preferred to have the hold-down frame 60 so dimensioned that its peripheral flange 61 lies in the same general plane as air plenum web 22 at all sides of the burner. This makes it unnecessary to have flanges 61 accurately located so as to fit around webs 22, and also uses less metal in frame 60.

The air nipple 77 can be mounted in the end wall 22 of the burner instead of in the burner back, if desired, in which case baffle 76 can be eliminated. Also said end placement can be duplicated on both ends of a burner, and the projecting air nipples and/or the pipe connections to them make convenient hanger mountings by which a burner can be held in pipe straps or U-bolts for example. Such pipe straps or U-bolts can slidably hold the nipples or pipe connections, so as to more readily allow for thermal expansion of the burner body as it heats up and cools down.

The matrix pad can have more than one joint 53, and such joints can be located within a few inches of each other, if desired. It is preferred however that each piece of matrix thus joined have an edge secured under the hold-down frame 60. Where the matrix pieces being joined have good edges at the joint, no special preparation is needed. Where those edges are damaged or out of true, they can be readily cut as by a table saw with a fine-toothed saw blade, to provide true edges.

The silicone sealant is sufficiently viscous that it can be spread over a matrix edge without penetrating into the matrix fibers more than about ¼ millimeter. Any of the commercially available silicone sealants are suitable. Sealants made of lower temperature non-porous materials such as natural rubber or neoprene or epoxy resins, can be used in place of the silicone sealant but they degrade more severaly when the matrix they unite is fired, and so are not preferred. The use of a rubbery sealant such as silicone rubbers is helpful in that the curing of the sealant does not convert it to a hard material that could cause damage to the matrix fibers when the matrix is flexed during handling.

Burners of the foregoing type can be packaged for shipment in the manner illustrated in FIG. 3. Two burners 101 and 102 are secured together with their matrix faces 103 face-to-face. Ordinary steel or plastic strapping 105 can be wrapped around the ends of the assembled burners, tightened and clamped in place, as a convenient way to so secure the burners.

Before assembling the burners in this face-to-face arrangement, it is particularly desirable to insert several cushioning strips 110 between them so as to cushion them against each other. A simple and highly effective cushioning strip construction is shown in FIG. 4 and FIG. 5. It is merely a narrow strip of 3/16 inch thick corrugated cardboard having holes 112 cut through, and scored at 114 so that it folds readily into the doubled-over position shown in FIG. 4. Holes 112 are spaced the same distance as the fastener heads 120 of a burner so that the cushioning strip is readily placed over a pair of such heads and thus holds itself in place until the second burner is placed over the strip.

Strips 110 in doubled-over condition are thick enough, ⅜-inch for example, to hold the burners apart so that they do not directly contact each other. Thus the hold-down frames 122 as well as the fastener heads 120 of the face-to-face burners are kept out of contact. One cushioning strip at each end of a burner is all the cushioning needed between short burners. Longer burners preferably have additional cushioning strips along their long edges.

The burners are desirably manufactured with their fastener heads 120 a standard distance apart, six inches for example, both along the length as well as the width of the burner, so that a single cushion strip configuration can be readily inserted anywhere. Such a cushion strip should have a length no greater than the narrow width of the burner face, and an eleven inch length works well with burners 14 inches wide. The matrix surface of such burners is also generally 11 inches wide and thus coextensive with the cushioning.

After the burners are strapped together the strapped assembly is inserted in a telescoping cushion-walled carton made of two tubular carton sections 131, 132. These sections are preferably of folded and pasted corrugated cardboard construction each having one end of its tubular length closed by an end wall 141, 142 respectively; the opposite ends of the tubular carton sections are open.

Packaging pads 144, of plastic foam for example, are best positioned under straps 105 and thus held so that they project beyond the longitudinal ends of each burner and the burner assembly does not tend to damage the end walls of the carton sections. Tubular protector sleeves or caps 146 can be placed over projecting nipples to protect them as well as keep them from damaging the adjacent carton walls. Pads 144 project beyond the backs of the burners a distance greater than the nipples, preferably as far as sleeves 146, and are readily penetrated by any air-seal nipples that they cover. These pads are thick enough to extend beyond the outer ends of such nipples.

The cartoned assembly can now be strapped together, as shown by strapping 148, and will withstand very rough handling.

The telescoping character of the carton sections permits the same pair of carton sections to be used to package burners of different lengths so long as their widths and depths are about the same. This is important because the burners are generally of about the same widths and depths but are required to have specific lengths which can vary widely from one installation to another. The burners are generally used in pairs, both burners of a pair being identical in length as well as in width.

A more preferred packaging technique is illustrated in FIGS. 3A and 3B. Here, burners 151, 152 are clamped in spaced-apart condition by means of clamping channels 161, 162, one of which is shown in greater detail in 3B. These channels have a central web 164 and flanges 165, 165. The webs 164 are wide enough, generally about 10 to 12 inches, to hold the burners apart by at least ¼ inch and hold their flanges 165 in a location beyond the furthest reach of the burner back, and of any projection therefrom, such as combustion mixture nipples 140.

Webs 165 are also punched to provide clamping slots 167 through which screws 169 are inserted and screwed into the body wall of each burner. To help receive these screws the body well can be fitted with unthreaded or threaded openings, as by punched-out holes into which are set riv-nut type threaded sockets 170. Such sockets can be open at both ends, in which event the screws 169 can be used to close off the sockets when the burners are unclamped and placed in service. Alternatively, the sockets can have their inner ends closed so that little or no air-seal gas will leak past them through the holes in which they are fitted.

The flanges 165 need only be wide enough to give the channels the desired rigidity and provide a surface against which the inner cartons 131, 132 are supported. A flange width of about 2 inches is adequate, but greater widths can be used with burners that are wider than the usual 12 to 14 inches. Cold-rolled plain carbon steel sheets about 60 mils thick are very inexpensively punched and shaped into the desired channels and work very well.

The FIG. 3A assembly does not require the strapping of the burners together before cartoning, so that the only strapping can be that applied around the cartoned assembly as shown at 141. Before cartoning however a cushion block 171 can be placed over the air-seal nipples 172 if those nipples project longitudinally from the burner ends. The cushion block can be a fairly stiff plastic foam such as polystyrene foam, and can have openings torn or punched out to receive nipples 172 and thus reduce the possibility of having those nipples tear out portions of the foam that might lodge themselves in the air seal plenum.

The strapping 141 can extend longitudinally or transversely of the burner lengths. Also screws 169 can, if desired, be of the flat-head type fitted into slots 167 that taper to match the tapered sides of the flat-heads of such screws, to thus reduce the projection of the screw heads against the cartons.

At least one pair of clamping channels 161, 162 should be used, but where the channels are much shorter in length than the burners, two pairs of such channels are preferred, one pair near each end of the burner assembly. Where the burners have wing structures on one or both sides, as in FIG. 10 or in the parent applications, the wings can be securely mounted on the burner and the packaging channels bolted to the wings rather than to the burner bodies.

The burners can be provided with any desired ignition means, such as a pilot flame or electric sparking. In FIG. 1 a spark ignition attachment is shown as a bracket 90 having a web 91 with a mounting hole or slot 92 for insertion under the head 66 of one of the fasteners. A flange 93 bent out from one portion of web 91 has a mounting hole or slot for holding a spark ignitor 94 so that its sparking end is located over the matrix portion through which the combustion mixture passes. Another flange 96 can be provided to engage the side of the hold-down frame 60 and thus more positively locate the ignitor. Other types of ignitors are shown in parent application Ser. No. 952,332.

The ignitors can be readily installed in the field, and are accordingly not needed to be packaged in the packaging arrangement of FIG. 3. However, that packaging provides empty spaces between the cartoning and the backs of the burners, and a separate envelope containing ignitors or ignitor parts can be fitted in those spaces.

The burners of the present invention can have a flat matrix face, as in FIGS. 1 and 3, or a concave or convex matrix face, as described in the parent applications. The concave type matrix face radiates energy that can be highly concentrated in a limited area, and is particularly suitable for heating such areas to very high temperature, or for very rapidly heating up such areas. An example of such rapid heating up is described in Ser. No. 701,687.

Figure 6:
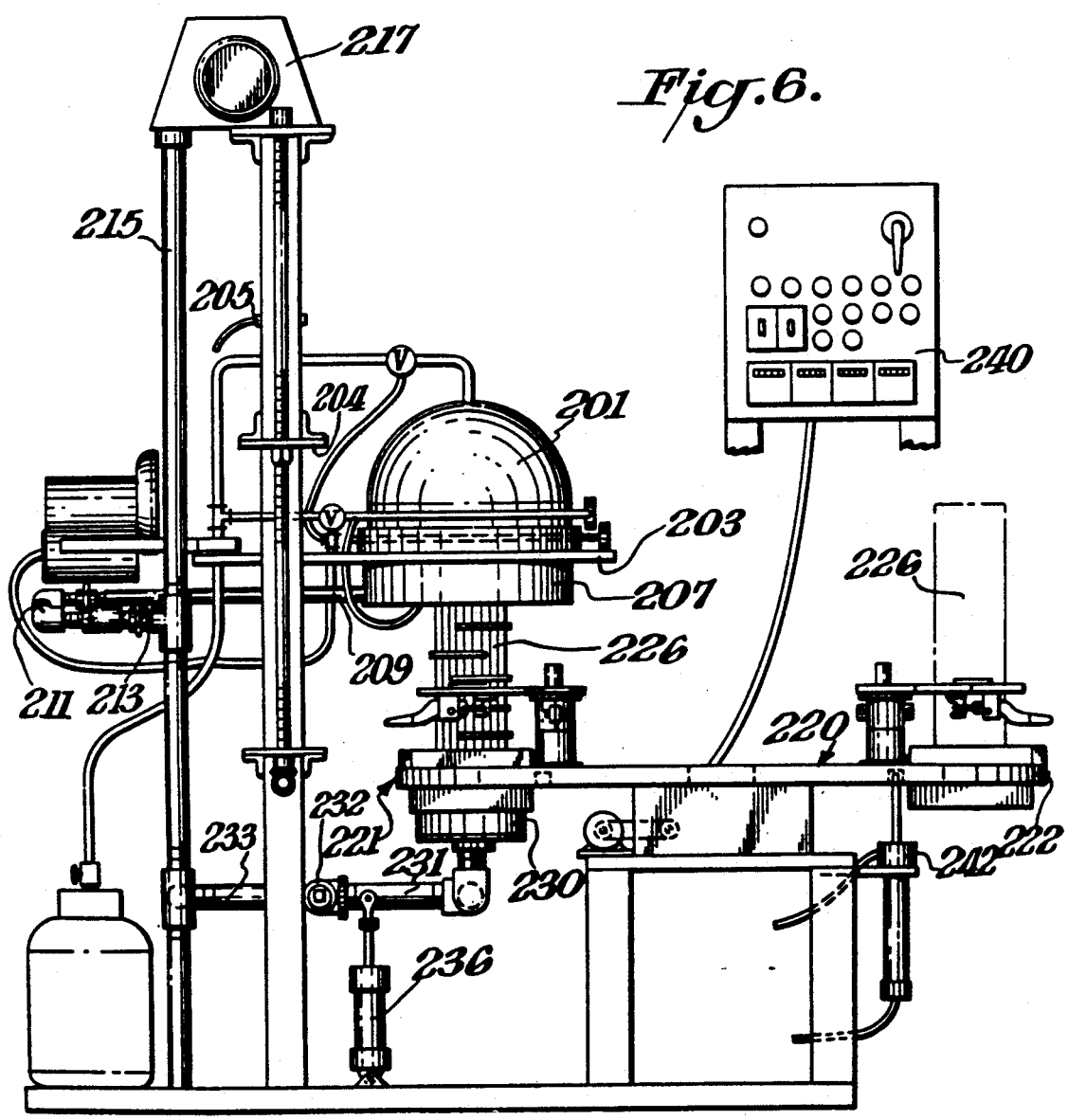
FIG. 6 is a side view of a different form of infra-red generating apparatus according to the invention, showing it as part of a brazing machine.

FIG. 6 shows a modification of the rapid heating device. The apparatus of FIG. 6 has a dome-shaped burner in a head 201 carried by a plate 203 that can be lifted and lowered with respect to an adjustable support 204 by an automatic arrangement, such as an electrically controlled hydraulic cylinder 205. Below the plate and surrounding the open bottom of the burner is a suction duct 207 that has its central wall perforated to draw off the gaseous combustion products generated by the burner. Duct 207 is connected through suitable piping 209, 211, 213 to a suction bus 215 which in turn is connected to the suction intake of a motor-driven centrifugal blower 217.

A rotating table 220 is positioned with one portion of it 221 below burner head 201 and defining a station at which a workpiece, in this case a tube-and-sheet heat exchange assembly 226, is held just under the burner head as described in Ser. No. 701,687.

The tubes are preferably staked or otherwise expanded at their ends so as to reduce the clearance between the outer surface of the tube and the edge of the hole in the tube sheet through which that end penetrates. The expansion is easily effected as by driving a suitably sized hard three-ribbed, bulbous tool about ⅛-inch into a tube end, while the tube is securely supported. This forms the tube wall radially outwardly, particularly at each rib, and causes the expanded tube portion to expand beyond the limit set by the size of the surrounding aperture in the tube sheet, locking the tube sheet in place by expansion both immediately above and immediately below the sheet. Withdrawal of the expansion tool can leave the tube end in the shape illustrated at 399 in FIG. 9.

A suitable expansion tool is conveniently made by grinding a bulbous nose on a length of drill rod, then grinding three generally tangential flats equally spaced around the major diameter of the bulb. Flats about 20 to 30 thousands of an inch deep easily allow about 8 mils expansion.

Expanding all the tube ends at each end of the tube bundle is desirable, but even expanding a few tubes helps lock the tube sheet in place against the expanded tube ends.

Another portion 222 of the table is out from under the burner head and provides another station where the workpiece can be fitted to the table in accurately located position, as by clamps, so that it will be properly located under the burner head when the table is rotated to bring the workpiece to station 221.

Below station 221, a suction head 230 is held on piping 231, 232, 233 that connects it to suction bus 215, and is arranged to be automatically lifted and lowered as by hydraulic cylinder 236, so that it can controllably apply suction to the lower ends of the tubes in the tube-and-sheet assembly. This application of suction draws some of the hot gaseous combustion products from the burner down through the upper ends of the tubes to effect more uniform and more rapid heat-up of the entire upper end of the assembly. A more complete discussion of the operation by which all the tube ends are sealed by brazing alloy to the upper tube sheet is contained in Ser. No. 701,687 (abandoned) the entire contents of which are hereby incorporated in the present application as though fully set forth herein.

As pointed out in Ser. No. 701,687 (abandoned), a particularly effective burner construction uses a single porous ceramic fiber mat in the general shape of a hat with a shallow plenum divided by a wall into two parts, air or other incombustible gas being fed through one part when that part is not being operated while the other part is being operated. The porous margin of the mat can be sealed by a high-temperature-resistant impregnant like aqueous sodium silicate, and the sealed margin clamped in place.

Such impregnation is illustrated in FIG. 1 of Ser. No. 701,681 (carried forward to U.S. Pat. No. 4,157,155) where it is designated at 97, and liquid silicone rubber is disclosed as an alternative impregnant for curing in place. Ser. No. 701,687 shows that the impregnation extends to a substantial depth in from the mat margin. It further points out that the filling of the mat pores at 97 also avoids localized collection of stagnant combustible mixture, and that the silicone or alkali metal silicate can be used to seal the mat edge to the plenum.

Ser. No. 701,687 (abandoned) also discloses that the heat for the fusion it effects can be applied by the burners of its parent application Ser. No. 674,409 filed Apr. 7, 1976, now U.S. Pat. No. 4,035,132, and the latter parent application describes additional matrix edge sealing arrangements.

Returning now to the present FIG. 6, the various suction pipes 209, 211, 213, 231, 232, 233 are of fairly large diameter, such as 3 inches, to adequately apply the suction. One very inexpensive type of piping to use for this purpose is standard cast iron pipe with lengths of it threadedly interconnected, using standard connection fittings such as elbows and tees. To permit the up and down movement of the burner head 201 as well as of the suction head 230, some of the threaded pipe joints can be left a little loose, even though such looseness permits leakage of air into the suction pipe. Thus, a loose fit of pipes 209, 213 with the elbows that connect them to pipe 211 permits vertical suction head travel to lift and lower pipe 209 with respect to pipe 213, without significantly affecting the application of suction to duct 207. Similarly a loose connection of pipe 232 with the tee that connects it to pipe 231 permits the suction head movement. In each case the loosely threaded joints are those in which the threading axis is the axis around which rotation takes place.

Instead of merely having a simple threaded connection loosely engaged, the looseness can be provided by fitting a standard three-piece union connector to the pipe. Such a standard union has two separate pipe-engaged parts that can be coupled together by the third part to make a tapered or conical joint. For the purpose of the present invention the two pipe-engaging parts are each tightly threaded or otherwise tightly secured to the respective pipe lengths to be connected, but the third or coupling part of the union does not tightly couple the first two parts together. Instead the coupling part, which is generally threadedly engaged, is left incompletely threaded. It can be secured in the incompletely threaded condition, as by a set screw threaded through the coupling part and jammed against the pipe-engaging part to which it is incompletely threaded. This keeps the coupling thread from rotating so that rotation is provided solely between the tapered or conically mating surfaces of the pipe-engaging parts. These mating surfaces are smooth and not exposed to the outside, so that they are not likely to become jammed by dust or dirt, like exposed loose thread joints.

The apparatus of FIG. 6 is operated as by an automatic pre-settable electric controller 240, to rotate table 220 indexing it accurately into position while the burner and suction heads 201, 230 are held out of the way, then lowering the burner head, and igniting the burner, followed by raising the suction head, all timed to get the workpiece properly heated and sealed. The burner can then be extinguished, the burner head raised out of the way, the suction head lowered out of the way, and the table indexed around to carry the sealed workpiece to station 222 where it is removed and replaced by a fresh workpiece while such removal and replacement are being effected, a workpiece previously mounted at that station but now at the sealing station is automatically subjected to the sealing sequence. Thus, at each indexing of the table one sealing operation is completed.

The suction duct 209 is spaced from the top of the workpiece by at least about ¼ inch, and its sucking effect on the gaseous combustion products does not interfere with the action of the suction head 230 which engages fairly tightly with the bottom ends of the tubes and draws hot combustion products down into those tubes.

The burner in head 201 is preferably equipped with an air-seal margin as in Ser. No. 775,838, U.S. Pat. No. 4,272,237, and with two plenum compartments as in Ser. No. 701,687 (abandoned). Also the plate carrying the burner head can also carry a blower that provides the air for mixing with gas to make the combustion mixture. No flexing connection is accordingly needed for the blower air. The gas for combustion can be supplied through a flexible connection, but since the quantity of gas used can be only about one-tenth as much as the air used, the gas line can be of very small diameter, such as ⅛ inch or less. Flexible tubing for such thin lines are no problem.

The combustion mixture is supplied to the burner at a rate as high as 100,000 BTU per hour and can complete a sealing heat-up in thirty seconds or less, even when the workpiece being sealed is a collection of fifty tubes each having a 20 mil wall thickness and an internal diameter of ¼ inch. In practice the sealing operation can take somewhat over 30 seconds. The sealed tube-and-sheet assembly needs several minutes of cooling before it is handled, so that in many cases sealing times close to a minute are available between indexing steps of the table.

The indexing positions of the table can be accurately aligned as by a locating pin 242 hydraulically or pneumatically raised to engage a locating socket in the lower surface of the table. The table rotation is preferably cam operated with its rotational speed varied so as to be quite low as it nears an indexing position, and substantially higher during most of its travel between indexing positions. A very desirable time for effecting an indexing step is about ten seconds or somewhat less.

Figure 8:
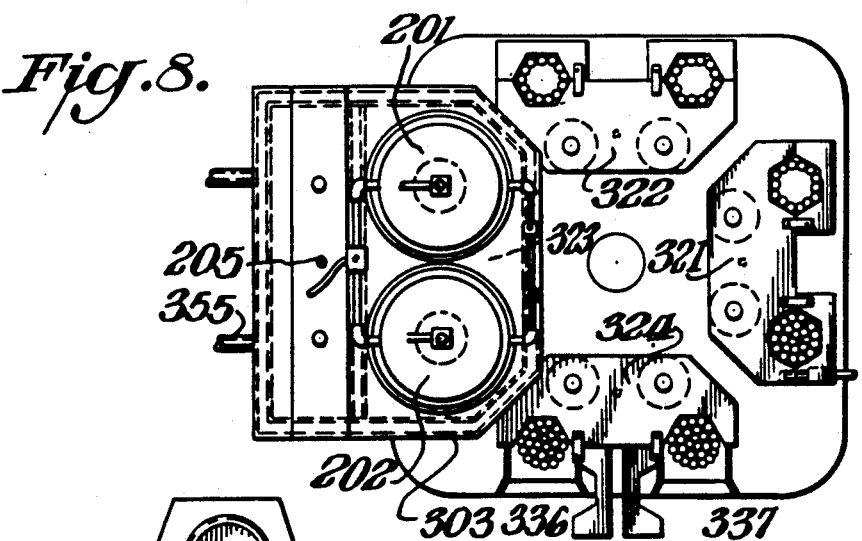
FIG. 8 is a plan view of the machine of FIG. 7.
Figure 7:
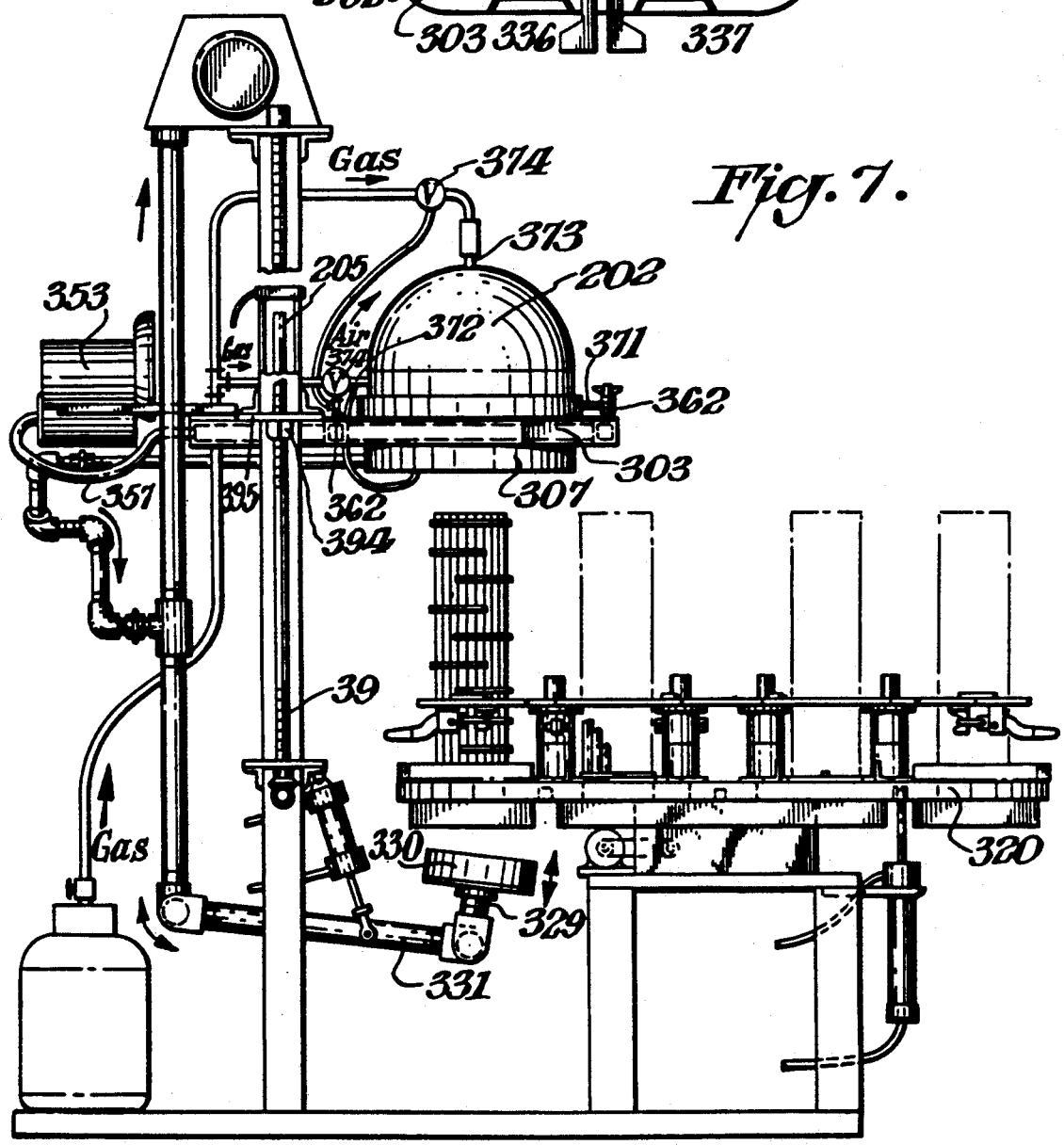
FIG. 7 is a similar view of a modified brazing machine pursuant to the present invention.

The construction of FIGS. 7, 8 and 9 is a modified tube-to-sheet brazing machine having a table 320 with four indexing stations 321, 322, 323, 324 at each of which two tube bundles are arranged to be clamped in place side by side. At station 323 two burners 201, 202 are located and held in a frame 303 in side by side relationship corresponding to that of the tube bundles. The frame accordingly carries both burners down into heating position over the two tube bundles at station 323.

Frame 303 is illustrated as having a periphery made of square tubing 350 traversed by a cross tube 351 interconnected with the peripheral tubing. This frame tubing is arranged to conduct air from a blower 353 to both burners, one or more intake nipples 355 being connected by hose 357 to the air outlet of the blower, and discharge nipples 361, 363 being provided close to the burners for connection to the various burner inlets. One inlet 371 receives air only, for use as marginal air seal pursuant to the parent application. Two other burner inlets 372, 373 are connected to mixing valves 374 that can be separately controlled to independently deliver air or air-gas mixtures to two separate plenums 381, 382 of each burner.

A suction conduit 331 is branched to provide two separate suction heads 330, one for the lower end of each tube bundle at station 323. The use of a single suction head that spans across both tube bundles and has only one suction connection is not desirable inasmuch as such an arrangement tends to cause the suction application to be too non-uniform; a little high in locations close to the suction connection and a little low in locations remote from that connection. The preferred suction connection is a conduit 329 axially aligned with the tube bundle through which it sucks gas downwardly.

Strips of thermal insulation 306, 308 can be inserted between fame 303 and the burner bottom, as well as between the frame and the suction ring 307, to help keep the frame from excessive heating. A baffler 312 can also be secured to the partition between burner plenums, to help direct the combustion mixture flow in plenum 381.

The apparatus of FIGS. 8 and 9 with its greater number of table stations has its table rotate from one station to the next in less time than that of FIG. 7, and has twice as many tube bundles brazed at each station. The combined result is a sharp increase in output. To operate the two-burner apparatus at its highest efficiency both burners are adjusted to supply about the same heat output, so that the sealing time is not lengthened unnecessarily by a lower heat output from one burner. If desired, the two burners can be timed so that one burns for a somewhat different time than the other, to help compensate for heat output differences or the like. Thus, one tube bundle can be previously unheated, and its companion bundle can be hot from a brazing that has just been completed on its opposite end or elsewhere; and accordingly needs slightly less heat-up.

A pilot gas line 390 can be used to supply a small pilot flame that ignites the burner each time either plenum is supplied with combustion mixture. The burners can also be operated by merely turning them down, rather than completely off, between sealing steps, in which event the pilot can be eliminated and ignition provided only when the apparatus is place in operation.

The table holding the tube bundles can be provided with replaceable and interchangeable inserts 392 that are specially shaped, drilled and positioned to receive the lower ends of different types of tube bundles. For bundles of different heights, the frame 303 is arranged to be set at different levels as by the rotatable long threaded shafts 393 threadedly engaged in nuts 394 welded to a cross bracket 395 against which frame 303 is held by its hydraulic operator or other prime mover.

The burners described above are desirably constructed with their metal portions made of sheet metal that can be as thin as 30 to 50 thousandths of an inch. The metal housing for the hat-shaped burners can be drawn or spun, preferably of aluminum, and the metal housings for the flat burners are conveniently of bent and welded-together stainless steel members.

The hat-shaped matrixes for the burners of FIGS. 6 through 9 can be formed in one piece or they can be pieced together. Thus, the brim of the hat can be cut out from a flat matrix sheet and joined to the crown-shaped matrix portion. The crown-shaped portion can be formed by interfelting the ceramic fibers from a suspension in air or water, in a porous mold made of wire screening shaped to provide the desired crown. The margin of the crown can then be butt-joined to the brim of any of the above-mentioned resinous sealants.

Although the layer of sealant used is extremely thin, it makes an effective block against movement of gas through it. The marginal air-seal air flow for the hat-shaped burner can accordingly be through the entire height of the brim of the hat up to the sealant layer, so that combustion mixture does not have to flow through a narrow matrix portion below that layer.

Figure 10:
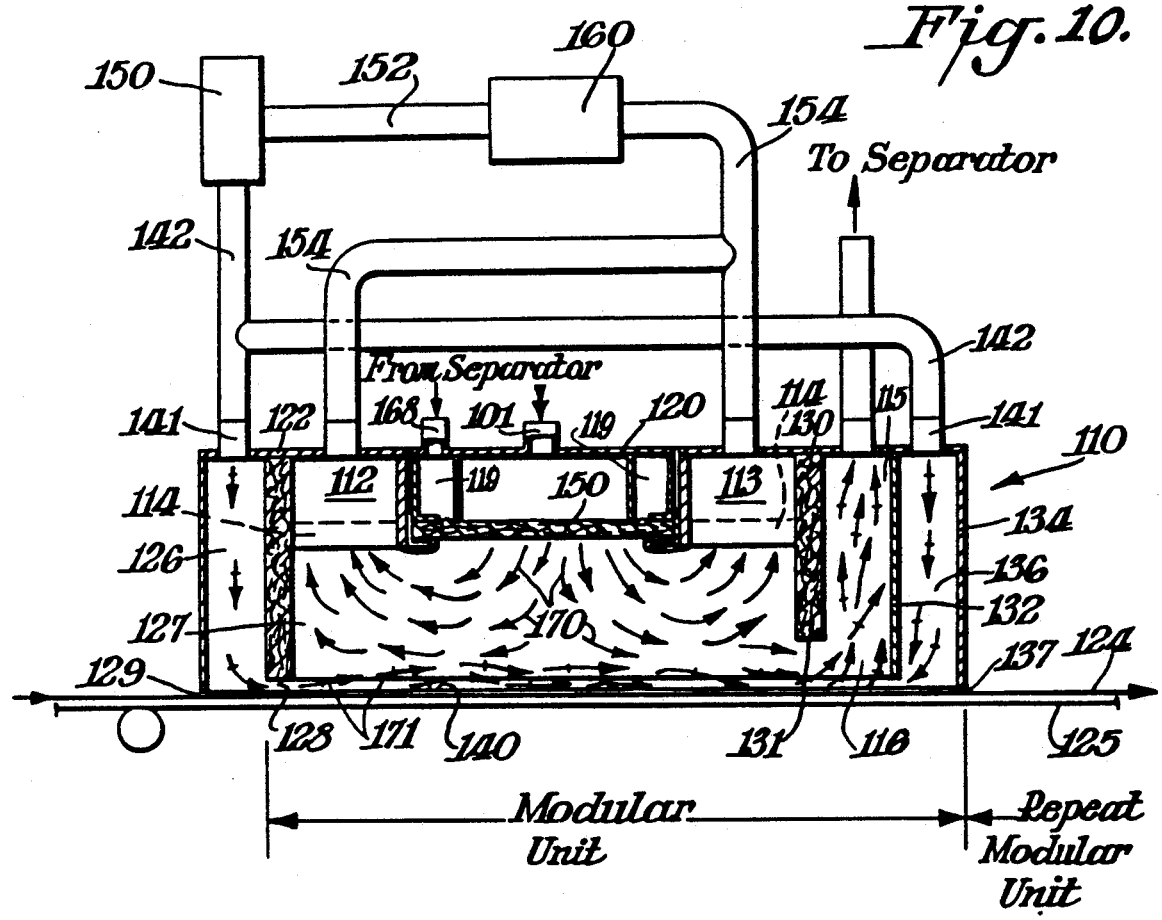
FIG. 10 is a vertical sectional view of a burner installation for drying a continuously moving web.
Figure 11:
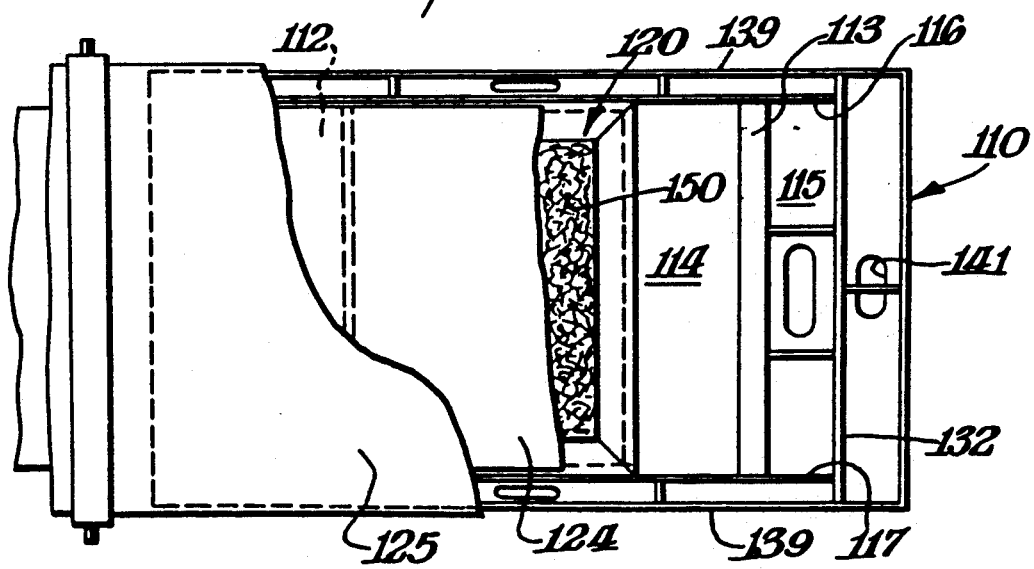
FIG. 11 is a plan view, with parts broken away, of the assembly of FIG. 10, looking up at its lower face.

FIGS. 10 and 11 show a burner assembly particularly suited for heat-treating moving webs carrying volatilizable material that contaminates the atmosphere if merely discharged into the air. Here a web 424 of freshly printed or coated paper as it moves from the printer or coater is passed under a heat-treater 410, and can be supported by a conveyor belt 425 or a series of idler rollers, or even a fixed supporting surface.

Assembly 410 contains a gas-fired burner 420 firing downwardly and having its incandescent face 450 spaced at least three, preferably four, inches from the paper web. On opposite sides of the burner are draw-off boxes 412, 413 having floors covered with porous reradiations 414 as described in parent Ser. No. 292,167.

Upstream of draw-off box 412 is a thermally insulating partition 422 that descends to about one inch or less from the paper 424, to provide an entranceway 428 for a shallow stream 440 of flushing gas delivered through external conduit 426. The upstream lip 429 of conduit 426 is even close to the paper 424, than partition 422.

Downstream of draw-off box 413 is another thermally insulating partition 430 extending downwardly toward the paper. The lower edge 431 of this partition is as far from, or a little farther from, the paper than the lower edge of partition 422. Downstream of partition 431 is a collection chamber 415 defined by wall 430 along with side walls 416, 417 and a far partition 432. An end wall 434 further downstream provides another external conduit 436, and like external conduit 426 the lower lip 437 of the external wall 434 of conduit 436 is located very close to the paper 424.

External conduits 426, 436 can be continued through side jackets 439, and can be interconnected that way to provide a peripheral enclosure through which gas is flowed downwardly to act as a curtain along both edges of the paper as well as upstream and downstream of the assembly 410. Upstream conduit 426 preferably has a depth in the upstream-downstream direction somewhat greater than that of the downstream conduit 436, so as to provide the extra gas that makes the shallow stream 440.

Both conduits 426, 436, as well as the peripheral jackets, are provided with intake connectors 441 and supply ducts 442, the latter being shown as joined together and forming the outlet for a blower 450. The intake 452 of the blower is fed from ducts 454 connected to draw-off boxes 412, 413. A heat exchanger 450 can be fitted in ducts 454 to cool the gases sucked from boxes 412, 413 into the blower.

The apparatus of FIGS. 10 and 11 is operated by introducing a stream of gaseous combustion mixture into burner inlet 401, igniting the combustion mixture as it flows out from face 450, and passing the paper 424 to be treated under assembly 410. Ignition is conveniently effected by sparking using the electrode arrangement described in parent application Ser. No. 952,332.

Blower 450 is operated to suck the very hot combusted gases through draw-off boxes 412, 413 and after they are cooled to about 400° F. or below, to blow them through conduits 426, 436, and the side curtain jackets 439. This provides the shallow stream 440 that flushes across the surface of the paper and carries off vapors of organic printing or coating solvent or the like. Stream 440 with those vapors is in turn drawn off through chamber 415 and can then be led to a separator for separating out those vapors, as by cooling to condense them out as liquids.

The path of the gaseous combustion products as they leave the burner face 450 and move to the draw-off boxes is shown by the plain arrows 470. The path of the shallow stream is shown by the primed arrows 471.

Burner 420 is shown as a ceramic fiber matrix type burner, and can be fed as gas-air combustion mixture that is exactly or approximately stoichiometric. Its combustion products will then contain little or no oxygen, and the gas-containment effected by the gas curtains in the construction of FIG. 10 will sharply restrict or completely prevent the leakage of oxygen-containing air into those combustion products as they move through the above-described circuit. There is accordingly little or no risk of explosion even when the vapors swept from the paper are highly combustible in air. Wire screen burners also provide similar stoichiometric control of oxygen in their gaseous combustion products.

Stream 440 is preferably kept as shallow as practicable, inasmuch as this reduces the volume of gas mixture from which the vapors are to be separated. Some of the combustion gases leaving burner face 450 can be bled off to the atmosphere downstream of blower 450, in the event the gas curtain around the periphery of assembly 410 does not dissipate all the excess gas.

Burner 420 is desirably of the air-seal type having around its margin a sealing plenum 411 described in the parent applications. Although this plenum can be fed air at its intake 468 without adding too much oxygen to the burner's combustion products, it can also be fed with recirculating combustion products. Temperatures as high as 350° and even 400° F. can be tolerated for gases fed to the sealing plenum 410.

Alternatively the gas supplied to seal plenum inlet 468 can be some of the gas separated from the gas-vapor mixture. Thus where the vapor separation yields a recovery stream of vapor-free gas, the contaminated gas can be fed to plenum 411. In the event the contaminating vapor is carbonized or converted to other undesired solids by the hot combustion gases, a little extra air can be added to the air-seal gases to help burn up such solids.

The separator to which is fed the vapor-containing gas from collection chamber 415, can merely be an absorption canister such as one containing a quantity of charcoal on which organic vapors and the like are trapped and held while oxidation products like $CO_2$ and water vapor pass through. Such an absorption canister becomes saturated with trapped vapors after a length of use, and when that happens the vapor-containing gas from 415 can be switched to a fresh absorption canister while the saturated one is rejuvenated and thus prepared for re-use. Rejuvenation is readily effected as by inserting the saturated canister in the air supply to burner input 401 so that the vapors trapped in the canister are flushed out by that incoming air and burned with the combustion mixture. The flushing out is made more effective by heating the canister as it is being flushed, preferably to a temperature above that at which it traps the organic vapor from compartment 415, and such extra heating is readily supplied by exhaust conduit 454 and/or heat exchanger 460. The trapping and flushing is conveniently effected by simple valve action that shifts the flow of exhaust gases and heating gases, so that the apparatus can be used without interruption.

Heat exchanger 460 can be used to provide heat for other purposes. However the combustion mixture entering burner inlet 401 can be heated somewhat by heat exchanger 460 inasmuch as a limited amount of such heating, i.e. to bring the incoming combustion mixture to about 200° F., will not damage the burner and will actually increase its thermal efficiency. Where the vapor is combustible and not sufficiently valuable to be recovered, gas-vapor mixture can be supplied from chamber 415 to seal plenum intake 468, after only a little cooling. Such recycled vapor will be burned as it enters the combustion zone of burner 420, and where its combustion products are only oxides of carbon and hydrogen, does not create any problems. The content of vapor in such recycled mixture is generally too low to call for an adjustment of the air-to-gas proportion fed to burner 420, but such an adjustment can be made, if desired.

The shallow flushing stream 440 is substantially cooler than the hot gaseous combustion products above it as it passes beneath the burner, and so tends to remain close to the paper even if it becomes further heated during such passage. Some movement of the hot combustion products into the narrow stream 440 can be tolerated, but it is preferred not to have any of the stream 440 work its way into a draw-off box 412 or 413. A temperature difference of at least about 400° F. between the stream 440 and the hot gaseous combustion products discharged by burner 420, is quite effective for this purpose.

Where more assurance is desired that stream 440 stay in place, or where that stream is to be made as shallow as ⅛ inch or shallowerd, a thin sheet of infra-red transmitting material such as quartz can be fitted between partitions 422 and 430 to help contain that stream. In such an arrangement the temperature difference between stream 440 and the hot combustion products above it, can be less than 400° F. The shallow stream should however not be so hot as to damage the paper 424.

The face of burner 420 becomes quite hot in use, and any metal members exposed to that heat are preferably covered with thermal insulation, as described in the parent applications, and the metal subdivided into sections that are spaced from each other to better allow for thermal expansion and contraction. Metal supports or retainers for thermal insulating partitions and the like can be similarly subdivided.

A belt conveyor used with the construction of FIGS. 10 and 11 can be porous or non-porous. A porous belt such as described in Ser. No. 312,730, U.S. Pat. No. 4,443,185, is preferred.

Where the paper 424 or other material being heated is moving at a very rapid rate or contains very large quantities of volatiles, a second assembly 410 can be mounted at the downstream end of the first assembly to provide more heating and more vapor flushing. Conduit 436 of the second assembly can then be eliminated inasmuch as its sealing function is not needed. The shallow flushing streams of both assemblies can be kept separate, or can be combined as by also eliminating chamber 415 from the first section, or the conduit 426 of the second sections, or both.

In the event the paper 424 is to be printed or coated on both faces, a separate assembly 410 can be arranged to separately treat each face.

The web to be treated can also be moved in an inclined or vertical direction. Where there is an appreciable inclination of the web path, the lower draw-off box for combustion products can be omitted and the upper one made larger. For vertically-moving webs both faces of which need treatment, a separate burner assembly can be applied against each face, with the shallow vapor-flushing stream moving upwardly or downwardly. Preferably the flushing streams move counter-current to the web.

Webs can have their lower faces treated in the manner shown in FIGS. 10 and 11, as by using an inverted burner assembly having an inserted infra-red-transmissive gas barrier close to the lower face of the web. The shallow vapor-flushing stream will then be above the burner, and applying a small superatmospheric pressure to that stream will help keep the web being treated from sagging too much.

The webs printed or coated on one face, can have their opposite faces exposed to the infra-red irradiation, with a shallow stream of vapor-flushing gas directed along the printed or coated face. The web itself will then separate the vapor-flushing stream from the combustion gases produced by the infra-red generation. Where the webs are somewhat transparent to the infra-red energy, damage by overheating is easily controlled by limiting the radiation. Special cooling of the web is accordingly not needed unless the web is quite thick. The heat treatment can be immediately followed by cooling with very cold air or by engagement with a water-cooled roller, to shorten the time during which the web remains hot. Such cooling is best applied to the face that was irradiated.

Where it is desired to recover the vaporized solvent in more or less anhydrous condition, the vapor-flushing gas should have a minimum of moisture content. Using unsaturated fuels such as pentadienes, butadiene, pentylenes, butylenes, propylene and/or ethylene, to fire the burners, yields combustion products having much less moisture content that that resulting from burning natural gas. The moisture content of those combustion products can be further reduced by passing those products through a moisture reducer such as steel wool which reacts with water vapor at elevated temperatures. Such reaction converts the reacted water vapor to hydrogen in amounts that can be over 10% by volume of the resulting combustion products.

Combustible vapors in the exhaust from compartment 415 can also be oxidized before venting by passing the exhaust, along with excess air, through an oxidizing chamber nearly filled with porous ceramic blocks impregnated with finely divided platinum. At the high temperatures of that exhaust vapors readily oxidize upon contact with the platinum.

The vapor-containing burner exhaust can be withdrawn through the draw-off boxes 412, 413, and compartment 415 omitted. The flushing gases 426, 436 then help guide toward those compartments the gaseous atmosphere under the burner, and minimize leakage of that atmosphere out through the spaces between the paper web 424 and assembly 410. A controllable proportion of air can be introduced into the recirculating gases to lower their temperature and/or introduce some oxygen to assist with the burning of vapors emitted from the web.

Alternatively, the heat exchanger 460 can be used to cause the hot combustion products to heat oxygen-poor gas such as that recovered after freezing out the solvent vapors. This heated gas is then passed through duct 452 to form the shallow vapor-stripping stream. A gas stream so supplied would have its water vapor frozen out along with the solvent vapors.

Burners other than of the ceramic fiber matrix type can be used in place of burner 420, and a ceramic fiber burner without an air-seal such as described in Ser. No. 952,332 can also be used. Alternatively cooling of the metal structure of the burners can also be arranged as by having water conduits brazed to that structure as described in Ser. No. 186,491.

The gas fired infra-red generators can also be used to heat sheets or webs formed by dry felting fibers that are to be bonded together. Thus some of the fibers can be made of, or coated with, thermoplastic resin that on heating and pressing will bond to the remaining fibers and hold the web together. Such a web-forming technique can use fibers from many sources, including fibers reclaimed from paper-making broke or from used newsprint. Thermoplastic resins that can be used as bonding agents include polystyrene, polyethylene, and polypropylene. The resin fibers so used can be manufactured by extruding or spinning a lower-melting resin over an inner filament of a higher-melting resin or other material. Such two-layer fibers do a better job of bonding over a temperature range wider than that suitable for any one resin.

Where the dry-felted web is porous, it is preferably heated while supported by a porous conveyor, with suction applied to draw at least some of the hot combusted gases through the web and the conveyor, as described in parent Ser. No. 312,730.

In the event web 424 can have different widths, burner 420 is preferably compartmented as described above. A series of combustion plenum compartments can thus be provided at each edge of the web, and these compartments can be as little as one or two inches wide, to accommodate small changes in the web width.

For maximum heat treatment of rapidly moving webs, heating assemblies can be provided on both sides of the web, and to save space such assemblies can directly face each other, with the intervening web relied on to keep the opposing burners from overfiring each other. It is practical, however, to leave about an inch of burner face exposed to an opposing burner just beyond the edge of a web, inasmuch as such exposure will generally not cause trouble and may simplify the burner compartmentation.

Instead of heating a web, a burner assembly can be used to heat a row of individual articles being advanced on a production line. Thus, a series of wire coat hangers can be hooked over an advancing screw that moves them through a coating station at which adhesive is applied to the lower length of wire on each hanger, then to a flocking station at which fiber flock is applied over the adhesive, and finally through a heating station where a gas-fired infra-red burner positioned face up heats the flocked wire and sets the flocking adhesive. Only a few seconds exposure to such a burner are needed, and even less time if a re-radiator panel is positioned above the moving hangers to receive the energy that radiates upwardly between successive hangers and re-radiate that energy downwardly.

Figure 12:
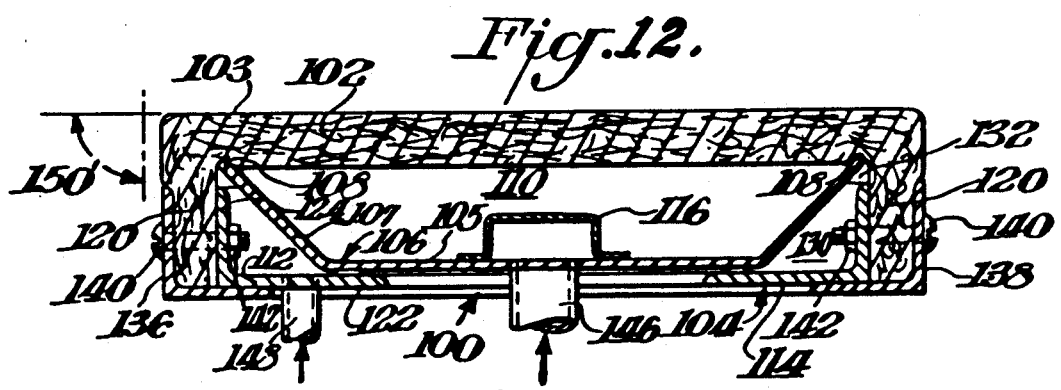
FIG. 12 is a sectional view of a gas-fired radiant heater according to another aspect of the present invention.

FIG. 12 illustrates a heater 100 with an air seal. Heater 100 has a cup-shaped matrix panel 102 of interfelted refractory fibers as described in U.S. Pat. No. 4,272,237, clamped by its edges around a support assembly 104 made of stainless steel or other metal members shaped from relatively thin stock, about 1/16 inch thick. A central dish 106 has a floor 105 and inclined walls 107 with raise edges 108 against which the panel 102 is pressed to define a combustion mixture plenum 110. Outer face 103 of panel 102 is of rectangular shape, and so is plenum 110.

Secured to the outer margin of the floor 105 of dish 106 is a series of angles two of which are shown at 112, 114, defining a rectangular frame against which the edges 120 of panel 102 are fitted. These angles are illustrated as having horizontal webs 122 welded or brazed to the floor of dish 106, and vertical webs 124 that approach but do not quite reach the dish edges 108. The frame angles define with dish walls 107 an outer plenum 130 that encircles combustion mixture plenum 110 and has a discharge slot 132 that is engaged by the margin of panel 102. The frame members are mitered or otherwise interfitted at the corners of the frame to minimize, or completely seal the outer plenum against leakage in those locations. Supply nipples 146, 148 are fitted in openings in the floor 105 and one or more of the frame angles 112, to deliver, respectively, combustion mixture and non-combustible gas. Baffles such as the U-shaped deflector 116 can also be provided to help more uniformly distribute the incoming gases. Inasmuch as air is generally the non-combustible gas that flows through plenum 130, a little leakage from that plenum doesn't do any particular harm other than consume a little excess air.

A baffle is not needed where the panel 102 is sufficiently resistant to gas flow as to permit the pressure of the combustion mixture in plenum 110 to be maintained at at least as high as 3 inches of water column. With pressures of 4 inches or more burners can be operated very satisfactorily without baffles, even when a single plenum is 60 inches in length and 12 inches in width and is provided with only one mixture inlet. Where the combustion mixture contains finely divided solids or dust, these particles tend to build up in the matrix directly opposite the combustion mixture inlet when no baffle is used, and this can cause uneven incandescence over the matrix face.

Anchoring of panel 102 in place is shown as effected with the help of a series of four or more clamping angles 136, 138, clamping the panel edges 120 against the frame angles, with the help of screws 140 that penetrate through aligned openings in the angles and are threaded into self-locking nuts 142 mounted in webs 124 as by securing clips or welding. The screws which need be no thicker than about 3/16 inch, are readily pushed through the edges of the panel without seriously damaging the panel, and any damage that might promote gas leakage is more than compensated by drawing up the clamps sufficiently to compress the panel edges. Standard panels have a wall thickness of about 1 to 1⅛ inches and an interfiber spacing such that more than half that thickness is fiber and binder, so that compressing the edges to reduce the overall thickness only about 10% sharply reduces the air space between fibers and greatly limits leakage.

However, very effective panels of interfelted fibers can be made by needling a mat of such fibers without the help of binder. Such needled panels can be extremely pliable, as compared to molded binder-containing mats that are stiff like boards, and can have their edges compressed down to as little as about 30% of their uncompressed thickness. Even compressing such edges that are originally about one inch thick down to about ⅜ inch provides an extremely effective back-up for the air seal.

For such panels it is preferred that the edge compression be down to about half the original thickness, or less. If desired, however, a pliable panel can be stiffened over its edges alone, or over its entirety, as by impregnating it with a water solution of starch or the like. In such stiffened condition, the degree of edge compression can be reduced.

To reduce any effect that the compression may have in breaking panel fibers that are binder-impregnated, the panel edges to be compressed are first dipped in water or other solvent for the binder carried by the fibers. Such wetting makes the edges more readily deformable so that the compressing is easily effected without seriously stressing the clamping structures. To assure uniformity of compression of board-like panels, the screws 140 are no more than about 8 inches apart when the angles have the above-noted wall thickness. Where the heaters are operated in confined spaces so that the clamping angles are subjected to considerable reflected heat, it is helpful to cut slots about six inches apart through the vertical webs of those angles, to allow for thermal expansion and contraction without distortion of the support. Such slots need only be about 20 mils wide, but can be omitted where the clamping angles do not engage each other at the corners of the frame so that expansion is possible at those corners.

A feature of the heater construction of FIG. 12 is that a plurality of such heaters can be juxtaposed to make an effectively continuous radiant heating assembly that covers an extended area. Thus, individual heaters are conveniently made with rectangular heater faces about one foot by two feet in size, larger sizes of stiff board-like panels being somewhat awkward to manufacture because the molding and handling is more difficult. However, by making the smaller sized panels so that their edges 120 are bent down at least about 90 degrees from the plane of the panel body, considering such edge as a flange bent down from a flat sheet, and locating the edge mountings so they are at least partially inboard of the outer face of that flange and not projecting beyond that face more than about 5 millimeters, they juxtaposed in a very desirable manner as illustrated in FIG. 13.

Figure 13:
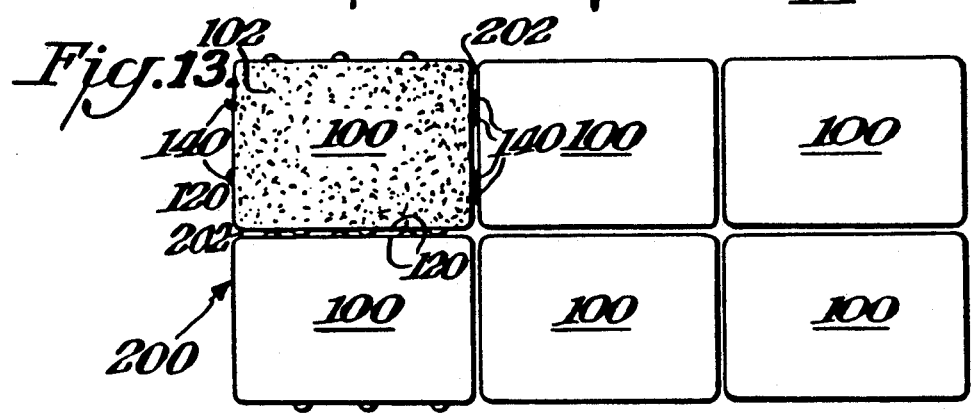
FIG. 13 is a plan view of an assembly of heaters of the type illustrated in FIG. 12.

In FIG. 13 an assembly 200 of individual heaters 100 is made with the adjacent faces of their panel edges 120 about 3 millimeters apart as indicated at 202. The margins of the panel faces 102 can be made so that they have an essentially zero radius of curvature where they bend into the edges 120, but it is sometimes simpler to make them with a radius of about ⅛ inch, and the foregoing 3 millimeter spacing of such rounded corners does not significantly detract from an effectively continuous heater surface junction, particularly where the combustion mixture is arranged to burn over the entire rounded corner. Increasing the spacing from about 3 millimeters to about 5 millimeters does make a significant discontinuity in the radiation uniformity but this can generally be tolerated. Spacings up to about ¼ inch or even up to about ⅜ inch can also be used.

While the clamping screws 140 are shown as having round heads and thus project out the furthest from the outer faces of the refractory panel edges, such projection is not a problem so long as it is not over the 5 millimeter limit noted above, or the preferred millimeter limit. These screws can be in unsymmetrical locations along each edge, so that the screws on one heater are offset from the screws of an adjacently positioned heater, as also illustrated in FIG. 13. Indeed the round-head screws can be replaced by socket-head screws which project a trifle more but are easier to install during manufacture. Flat-head screws can alternatively be used with the screw openings in the clamping angles countersunk so that the screw heads do not project beyond those angles, if minimum or zero spacing 202 is desired.

Nuts 142 can be omitted and the openings in the vertical walls of support assembly 104 can be threaded, in which event it is desirable to have the threaded aperture slightly undersize so as to make a very tight engagement with the threads of the screws 140.

For use in the burner of FIG. 12, a pliable needled panel behaves very much like a blanket, and can have its edges folded and tucked in place between the side anchorage members. Because of their high pliability, the corners of such panels will squeeze into shape, although it may be helpful to cut away all excess corner material, and to even notch out some of the panel corners to make it easier to clamp these panels into place. It is preferred to confine any notching to portions of the corners covered by the anchorage members so as to reduce the leakage of gas at the notches.

It is not necessary to have the entire margin of each refractory panel 102 flanged over as at 120. Thus, each of the panels in FIG. 13 has at least one margin that is not juxtaposed to another panel, and some have two such non-juxtaposed margins. Where only two panels are to be juxtaposed, each can have only one margin provided with a flanged-over edge 120, in which event the remaining three margins can have simple construction as shown in the flat panel exemplifications in the parent applications as well as in FIG. 1.

Very close juxtaposition can also be provided by molding or shaping juxtaposed edges 120 so that they are bent down more than 90 degrees from the horizontal as measured by the angle 15 in FIG. 12. A panel can thus be molded around a suitably shaped molding screen with as many as three of its four sides having flanged edges bent as much as 100 or 110 degrees measured at angle 150, and the thus molded panel can then be slipped sideways off the mold in the direction away from its fourth side. Where only one flanged edge margin is desired, it can be made when molding the panel, or by bending down the edge of a flat-molded panel, after that edge is softened by wetting.

Figure 14:
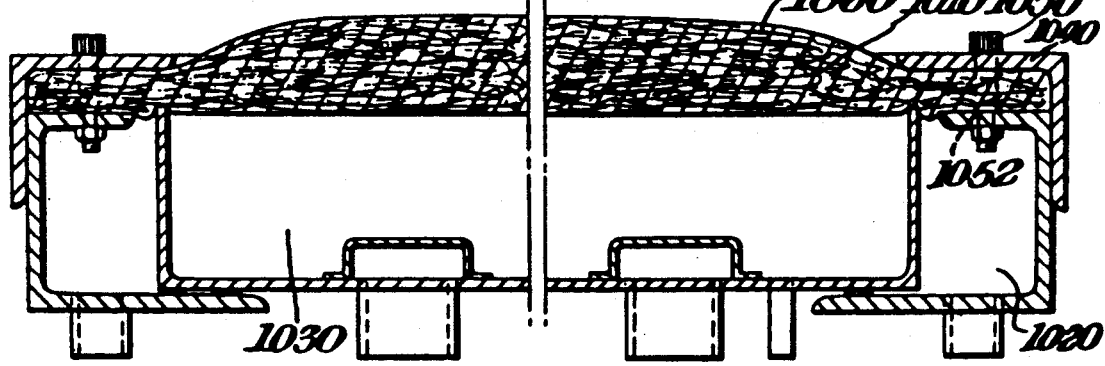
FIG. 14 is a sectional view of a different heater construction pursuant to a further aspect of the present invention.

The needled ceramic fiber panels described above are conveniently manufactured in very long lengths, as long as 25 feet or even longer. Such panels are particularly suited for use with very long radiant heaters, and a construction of this type is shown in FIG. 14.

Here a ceramic fiber panel 1010 about fifteen feet long and about one foot wide, has its edges clamped against the face of an air seal plenum 1020 surrounding a rectangular combustion mixture plenum 1030. Angles 1040 compress and clamp the panel edges, being drawing against the air seal plenum face by screws 1050 that can be fitted with shoulders 1052 against which they can be tightened at relatively high torque with a minimum of attention.

A panel 1010 that is not stiffened with binder or the like, will belly out as shown at 1060, under the influence of the pressure of plenum 1030. This is not particularly harmful, and is in some respects desirable because it reduces the heat radiation from the face of the panel to the clamping angles.

The bellying action can be reduced by pretensioning the panel when it is mounted, or mounting against the outer face of the panel a wire hold-down screen that holds the entire face of the panel in essentially flat condition. The wire of the screen can be made of heat-resistant material like nichrome. Such a hold-down screen can extend from one end of a burner to the opposite end, but need not extend over the entire width of the panel. Thus, a matrix panel 7 feet long and one foot wide, and of readily bellied-out construction, will be adequately held with its outer face essentially flat by a long 20-mesh nichrome wire screen 4 inches wide having its ends clamped under or welded to the hold-down frame to position the screen along the central 4-inch width of the panel.

Figure 15:
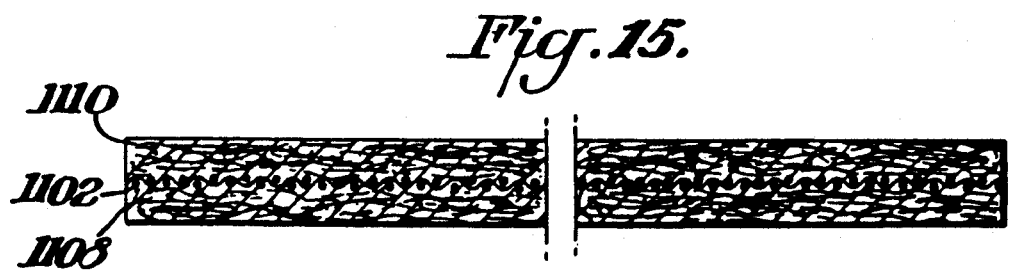
FIG. 15 is a detailed view of an alternative heater element for use in the present invention.

Another technique for stiffening a pliable panel is to needle it around a stiffener as shown in FIG. 15, for example. In this construction a wide mesh metal screen 1102 is laid in between two layers 1108, 1110 of ceramic fibers, and a needling operation then performed to interfelt the two fiber layers.

The panel can also be stiffened by encircling it with a metal frame to which its edges are secured as by silicone resin or other high-temperature-resistant adhesive. Such a frame need not have a face flange like that of angles 1040, and can be fitted to a burner body as by screws threadedly engaged between the panel frame and the burner body. Stiff binder-containing panels can also be mounted in this way.

A peripheral stream of non-combusting gas can with such a framed panel, be passed through the panel near its margin, or passed over the frame on the outside of the panel. Either technique keeps the edge adhesive from destruction by over-heating.

FIGS. 16 and 17 show a particularly desirable automatic igniter construction fitted into a heater of the type illustrated in the parent patents. A standard combination 500 of spark rod 501, ground rod 502 and flame-checking rod 503 is mounted so that the rods are generally parallel to and about 1/16 inch above the outer face 505 of the porous refractory panel 340. Below the opposite face of the panel underneath the rod assembly, the box plenum is provided with a partition 507 that isolates a chamber 509 from the remaining space in the box plenum, and the chamber is fitted with its own supply connector 511 to receive a separate combustion mixture.

The spark rod 501 and flame-checking rod 503 are each housed in two identical insulators 550 which go through aligned openings punched in the top flange 520 of the clamping frame 342 and in the flanges 316 and 314 of plenum 304 as shown in FIG. 16. Ground rod 502 is welded or brazed to flange 520. The ends of rods 501 and 503 projecting out through flange 316 are threaded to each accept a connector 542 which holds them in place and provides a ready connection for necessary wiring.

The construction of FIGS. 16 and 17 is operated to start the burners using a safety check. A separate pilot combustion mixture is first started into chamber 509 and at the same time the spark rod is electrically energized to begin sparking. If the flame rod does not sense a flame within a short period of time, such as 10 to 30 seconds, the flow of combustion mixture can be automatically cut off and the starting sequence must then be manually recycled, preferably after the combustion mixture flow is checked as by purging chamber 509. When the starting sequence causes ignition of the separate combustion mixture, the flame-checking rod 503 senses the ignition and opens the valve that feeds the main combustion mixture into plenum 302 which is then ignited by the flame at chamber 509.

By using a small chamber 509 with a low BTU/hour input for the automatic ignition test, the danger of explosion at ignition is minimized. A chamber volume of about 100 cubic centimeters or less is very effective for this purpose. However, where the pilot chamber 509 extends along the entire edge of a combustion mixture plenum 302, as indicated in FIGS. 16 and 17, the total volume of the pilot chamber is much larger.

The pilot combustion on the radiating surface of the panel contributes to the overall radiation.

The spacing of the rod assembly from the refractory panel is preferably kept very small so that the rods do not interfere with placing the radiating surface close to the material being irradiated, such as a moving textile web that is being dried. Because the effectiveness of the heater increases when brought close to the material treated, the spacing of the panel from that material is sometimes arranged to be as little as two inches or even less.

FIGS. 18 and 19 show a hot air heat exchanger construction for house heating pursuant to the present invention. Here a cylindrical heat exchanger 800 has a hollow interior 802 in which is received a fibrous panel 804 also of generally cylindrical shape. The panel has an open end 806 clamped to a mounting plate 808 as by means of a rib 810 formed or welded on the plate and around which the panel end is squeezed by a split sheet metal strap 812 whose ends can be pulled together by a tightening screw 814.

Before the panel is fitted in place a partition disc 820, held on a tubular support 822 having an externally threaded extension 824 is mounted on mounting plate 808 which has a threaded aperture 826 that threadedly receives the threaded extension 824.

Partition disc 820 has its periphery located just above the edge of rib 810, to define a marginal slot 830 for discharge of a sealing gas stream through the marginal portion of the panel 804. An inlet nipple 832 provides for the delivery of the sealing gas stream to the sealing plenum 840 below partition disc 820. Extension 824 provides for the supply of combustion mixture to the plenum 850 above the partition disc.

Strap 812 is also shown as carrying a ring of outwardly-extending ears 842 that help retain a mass of insulation packing 844 fitted around the open end of panel 804 when mounting plate 808 is brought into engagement with the mouth 846 of heat exchanger 800. Some of those ears are also perforated to receive an ignition and test assembly 860 shown in the form of a series of ceramic tubes 862 each having an enlarged head 865 threaded into aligned openings in the mounting plate. Through the passageway in each ceramic tube there penetrates a rod 867 having a disc-shaped inner end 870 and staked as at 872 so that it is appropriately located with respect to the ceramic tube. A washer 874 can be slipped over each rod before it is inserted in the ceramic tube, to furnish better positional coaction with the tube and the staking. The outer edge of each rod can be threadedly engaged to a mounting tip 876.

The discs 870 of each rod are arranged so that they are in edge-to-edge opposition suitable for sparking and for flame detection, as described in connection with FIGS. 16 and 17.

The outside of heat exchanger 800 can be located in the circulating air plenum of a standard house heater, or if desired in a water tank containing water to be heated. This heat exchanger can be made of metal or even of glass, borosilicate glass being particularly suited when the heat exchanger is used to heat water. Water to be heated in this way can be colored with dyes for example, to better absorb radiant energy transmitted through a transparent heat exchanger. Metal heat exchangers are desirably ribbed to increase their effective surface area and thus increase their heat transfer to surrounding air or the like.

Thus the hollow interior 802 can be fitted with a coil of glass or metal tubing through which water is circulated to supply domestic hot water heating radiators. The tubing can also be extended up through the duct from which combusted burner gases are discharged to abstract heat from those gases. By arranging for the water to first flow through the tubing in the discharge duct and then through the irradiation zone 802, the water is efficiently preheated and the discharged gases cooled to as low as 180° F. or even lower. Such a low exhaust temperature is a measure of the high thermal efficiency thus attainable, and is partly due to the fact that the temperature of the combustion mixture where it burns on the outside face of fibrous matrix is about 1000° F. cooler than the combustion temperature reached without the help of the matrix. Also very little excess air is used with the burners of the present invention. An entire burner and heat-exchange assembly using the so-modified FIG. 18 need only be about one meter tall to supply the heat and domestic hot water for a three-bedroom home. Where such a home is heated by hot air, the tubing carrying the heated water can be run through the hot air plenum of a hot air distribution assembly to heat the air thus circulated through the home.

The water circulated in the tubing can be mixed with a little ethylene glycol or the like to avoid freezing and to increase its boiling point.

A gas exhaust at very low temperature might not create sufficient draft when merely discharged into a chimney flue. However, the combustion mixture of the present invention is supplied to its burner under a few inches of water column pressure above atmospheric, and after burning leaves irradiation zone 802 at a small superatmospheric pressure that helps create a chimney draft. Additionally the blower used to deliver the combustion mixture to the burner can also have a tap that blows some excess air up the chimney flue to help draw the combusted gas up the flue.

At very low gas discharge temperatures it is possible for moisture to condense out from the gas discharge. Such condensate can be permitted to run to the sewer.

Another feature of the present invention is the ability to use an inert or reducing gas to seal the combustion mixture on its way through the porous refractory panel. Thus the sealing gas can contribute to make the burnt combustion mixture provide an atmosphere of exceedingly low oxygen content, or even of strongly reducing ability as, for example, by reason of a significant hydrogen content.

FIG. 20 shows an annealing tunnel furnace 900 having upper and lower radiant heaters 902, 904 facing each other and held in fixed relation by side blocks 906 of thermal insulation. A wire mesh conveyor 908 is arranged to slide through the furnace interior to carry workpieces that are to be annealed or brazed. A strip curtain 910 closes off the entrance to the furnace, above the conveyor. The portion of the entrance below the conveyor is shown as closed by a one-piece wall 912.

The heaters 902, 904 are operated in the manner described above, except that the sealing gas streams, indicated by arrows 920, can be cracked ammonia, or a propane-nitrogen mixture, or pure propane or the like. With such sealing gases, it is preferable to adjust the combustion mixtures so that they have little or no surplus oxygen. The furnace interior then becomes a very effective reducing atmosphere that will prevent oxidation of the workpieces and even reduce any oxidation present on those pieces when they are introduced into the furnace. Notwithstanding the strongly reducing character of the furnace interior, the burning of the combustion mixture takes place very effectively to provide radiation at temperatures at least as high as red head.

For high heat output from the furnace, the workpieces should be arranged to absorb larger proportions of the infra-red energy, as by packing them very close together in the conveyor 908, or by arranging for a workpiece to be a continuous length of material that spans the entire width of the burner faces.

The heaters of the present invention can be used for soldering with silver solder and even with soft solder, as well as for brazing. For soft soldering the heat requirement is relatively low and a flat-faced burner is more than adequate. Articles having extensive width, such as solar panels, can be very readily soft soldered by heating them with a row of burners, and in such arrangement the burners are preferably placed under the panel so that they are operated with upward flow of combustion gases makes it unnecessary to have the special flow directing structure used for brazing.

FIG. 21 illustrates the manufacture of corrugated board 1010 from a corrugated core sheet 1012, a lower face sheet 1014, and an upper face sheet 1016. Corrugating rollers 1041, 1042 corrugate the core sheet 1012 where these rollers mesh, and roller 1041 carries the corrugated sheet past an applicator roll 1046 that applies adhesive to the lower edge of each corrugation. Roller 1041 also presses the thus coated core sheet against the lower face sheet 1014 which is supported by a backing roller 1051.

Face sheet 1014 with the corrugated core sheet adhered to it moves to the right as shown in this figure, carrying the top of the core sheet pas a second applicator roll 1047 which applies adhesive-coated corrugation after the lower face sheet is pressed at roller 1051, so that the adhesion of the top sheet is best reinforced by the application of heat.

To this end a burner 1000 is shown as held above the face sheet just down-stream of roller 1060, firing downwardly onto the face sheet. Only a few seconds exposure to such heating will set the top face adhesive. Heating can similarly be provided for the lower face sheet if desired. Also the freshly assembled sheets can be gripped by continuous conveyor belts pressing against one or both face sheets to more securely keep the sheets pressed as they advance to the heater and are withdrawn from it.

Burner 1000 is shown as provided with an electrically lit gas pilot light more fully illustrated in U.S. Pat. No. 4,272,238, but it can also be equipped with re-radiation and/or confining boards as in FIG. 18 of Ser. No. 186,491. It is also helpful to have an additional burner heating the lower face of the assembled corrugated board, as well as further burners pre-heating the lower face of sheet 1016 as well as the upper face of sheet 1014 just before these sheets reach the feed positions shown in FIG. 21. Of particular help is the orientation of the burner so that the hot combusted gases they generate become trapped in the corrugations and thus continue to supply heat after the corrugated sheet leaves the burner zone. Thus, lower sheet 1014 can be fed upwardly rather than laterally to roller 1051, and an upwardly facing burner can be mounted under the corrugated sheet 1012 where it is carried by corrugating roll 1041 toward roller 1051.

The infra-red energy radiated by ceramic mat burners has a very high power density. It can, for example, cure a polymerizable silicone coating with as little as 5 seconds of raidation. It is also very effective for drying wet webs of paper or the like without the help of any steam-heated rolls.

The apparatus of FIG. 22 has a series of rows of downwardly-facing burners, three rows of which are shown at 1101, 1102 and 1103. A web of wet paper 1110 makes a series of passes at 1111, 1112 and 1113 below the faces of the burners, with the help of reversing rolls 1121, 1122, 1123 and 1124. The paper can then be wound up, or if further drying is needed can be exposed to additional burners or looped over steam cans or other drying equipment. If desired, all or some of the reversing rolls 1121, 1124 can be internally heated as by steam or other fluid, to make the drying apparatus more compact.

Each row of burners has a set of relatively small side-by-side individual burners 1130 similar to the burner of FIG. 5 of Ser. No. 186,491, U.S. Pat. No. 4,378,207. As shown in FIG. 23, each burner 1130 has a generally rectangular metal body 1132 of metal like aluminum that conducts heat very well, and with a wall thickness of about ⅛ inch so that it is thick enough to effectively conduct away excessive heat. In FIG. 23 the burner has a combustion mixture deflector plate 1134 supported by posts 1135 secured to the plate and to the back wall 1136 of the burner body. The burner body, plate, and posts are preferably brazed together, as by the molten flux dip brazing technique referred to in U.S. Pat. No. 4,272,238.

A single insulation block or pad can cover the backs of an entire row of burners, if desired, or can cover a single back or any other number of adjacent backs.

The burner sides 1155 that are aligned to make the leading and trailing burner edges across which the paper 1110 moves, are shown in FIGS. 23 and 24 as fitted with insulation blocks 1157 that are molded into angularly related flanges 1158 and 1159. Flanges 1158 are clamped against sides 1155 with the help of posts 1160 similar to posts 1135 that are only secured to the burner side walls. Insulation flanges 1159 flare outwardly from the burner faces, preferably at an angle of about 60 to 80 degrees from the vertical. The lower face 1163 of these flaring flanges can have its surface area effectively increased as by a succession of adjacent grooves 1161. The width of flanges 1159 is preferably from about ⅛ to about ½ the width of the burners, in order to take full advantage of the heating effects of the hot combustion gases discharging from the burner faces when the burners are operating.

As shown in FIGS. 22, 23 and 24, the hot combustion gases are kept by thermal deflectors 1162 from escaping over the free edges of the burner walls 1164 at the ends of each row. Deflectors 1162 can be mounted to walls 1164 the same way blocks 1157 are mounted, but the deflectors preferably extend downwardly lower than the bottom edges of blocks 1157, to a level below the path of the paper 1110. The hot combustion gases rise and will accordingly flow upwardly around the bottom edges of blocks 1157, as shown by arrows 1165.

FIG. 22 also shows exhaust ducts 1168 that collect the hot combustion gases which can then be used as a heat source for other operations or to pass through rolls 1121–1124 to heat them. Ducts 1168 can be provided with baffles 1169 that direct the hot gases over a few more inches of the paper 1110 before those gases are withdrawn.

Each individual burner of a row can have its own feed trimming valve 1170 that can be adjusted to offset uneven heating effects that may be caused by differences in the porosities of the matrix faces of adjacent burners. The burners in each row can be mounted with their adjacent sides in direct contact, as in FIG. 5 of Ser. No. 186,491, U.S. Pat. No. 4,378,207, but preferably a compressible pad 1172 of thermally resistant material such as ceramic fibers is fitted between adjacent burners in FIG. 24. Such a pad about ⅜ inch thick compressed to half that thickness does not make too much of a gap in the incandescent surface defined by the burner faces, and it also helps to keep the burner-to-burner joints plugged against the leakage of hot combustion gases as a result of thermal expansion during operation.

The gaps between individual burners of a row can have their radiation interrupting effects reduced by shaping the burners so that these gaps extend to an angle with respect to the direction of paper movement. This will spread the radiation interrupting effect over wider portions of the paper, or even over the entire width of the paper.

The radiation interruption at the gaps is also reduced by a tapered thickness reduction at the free edges of the burner side walls, as shown in FIG. 31 of Ser. No. 94,901. The burner matrixes 1176 are sufficiently resilient that they can be squeezed into place against such tapered walls and thus effectively reduce the width of the outer lip of the wall to about 1/16 inch even though the balance of the wall is about ⅛ inch thick.

As pointed out above, the movement of the hot combustion gases over the flared surfaces 1160 heats up those surfaces to temperatures that come close to the temperature of the incandescent burner faces, particularly when those surfaces are of low density thermal insulation. The resulting high temperature of surfaces 1163 will accordingly generate additional infra-red radiation that helps dry the paper 1110. This additional drying is provided without increasing the amount of fuel used, so that the fuel efficiency is greatly improved.

FIGS. 23 and 24 further show the provision of a burner igniter in the form of a spark-fired pilot flame director 1178 as in FIG. 21. This can be provided with its own flame-detecting rod 1179, or if desired an ultraviolet detector 1180 can be fitted at the opposite end of a row of burners, to detect burner operation when the burners are being lit, and automatically shut down the gas feed if the burners do not ignite or if they should be inadvertently extinguished.

The grooving 1161 preferably has a depth of at least about ⅛ inch, and this depth can be as much ½ inch. The grooving effectively increases the surface 1161 as compared to a perfectly flat surface, and an increase of at least about 50% is desired. To this end the profile of the grooves can be triangular, rectangular, sinusodial, or have any other shape.

The combustion gases discharging from the far ends of the surface 1161 can still be sufficiently hot to warrant their use as for heating a further radiating surface. Thus, those gases can be sucked through a porous insulator such as a ceramic fiber matrix positioned as an outer extension of surfaces 1161. The resulting relatively forceful flow of still hot gas through the porous matrix heats it up more effectively than the surface 1161 is heated, so that the heated face of the porous ceramic fiber matrix can contribute a significant amount of additional infra-red radiation.

The use of the surfaces such as 1161, with or without the foregoing extensions improves the operation of any fuel-fired burner that generates hot combustion gases. Thus burners 1130 can be replaced by ceramic tile burners, metal screen burners, or ceramic cup type burners, or even direct flame burners, and in each case the burner operation shows a similar improvement.

The individual burners 1130 in the assembly shown in FIG. 24 are preferably dimensioned so that different burners or groups of burners 1130 can be operated. In this way all the burners can be operated to heat a web 1110 of maximum width, and smaller numbers of burners can be operated to heat webs of smaller widths. Shutting down one or more burners has been generally effected with minimum construction cost by shutting off the flow of the propane or other combustible gas to those burners while permitting continued flow to those burners of the air otherwise mixed with that combustible gas to make the combustion mixture.

The same combustible gas shut-off has been used for emergency shut-downs, as for example, when the web stops advancing and it is necessary to keep the stopped web from becoming charred by the burners. However, such gas shut-offs are not prompt enough for certain stoppages such as when the web is a paper being printed at high speed with ink that requires heat treatment to dry rapidly. Such printing machines can be stopped in less than a second or two when there is an emergency such as tearing of the paper web. For such very abrupt stopping, it is preferred to rapidly trip shut the air supply to the mixer. This immediately stops the flow of combustion mixture and extinguishes the burner. The ceramic fiber matrix on which the combustion had been taking place, prevents flash back of the flame toward the mixing equipment and thus prevents damage.

The standard mixing equipment includes a so-called zero-pressure regulator which is designed to prevent flow of gas to the burner when the flow of air is interrupted, but when other types of mixing equipment is used, it is desirable to have the emergency shut-down at both the air flow and the gas flow. Electrically-operated solenoid valves made it simple to simultaneously and very abruptly shut off both those flows.

Such simultaneous shut-offs may also be desirable even when zero-pressure regulators are used for mixing. The use of a solenoid-operated gas valve is very helpful when an installation contains several burners some of which are to be selectively kept out of use on occasion. Also, the closing of the gas valve permits simpler cycling of the burner safety system for relighting.

It is generally desirable to have the burners located below the work being irradiated inasmuch as the burner body is then not subjected to so much heating and the rising hot combustion products remain longer in contact with the work thus increasing the heating effect. In some cases, however, the only practical installation has the burner firing face down over the work.

Figure 25:
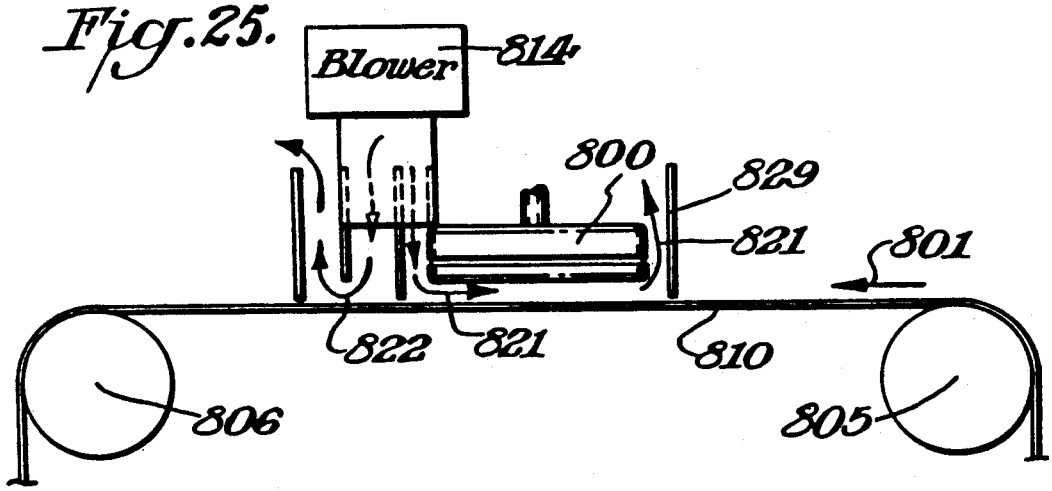

FIG. 25 shows an installation of this type in a portion of a paper-making machine preceding all or most of the steam can driers. A paper web 810 120 inches wide is here illustrated as moving in the direction of arrow 801 between two rollers 805 and 806. Over the web is positioned a burner 800 firing face down. To assist in the removal of moist air from adjacent the burner and this speed the drying action, a blower 814 is arranged to blow a stream of low-humidity air between the burner and the web, as indicated by the arrows 821. This stream moves longitudinally of the web and transversely of the burner, countercurrent to the paper movement, and a baffle 829 can be provided to help deflect the stream away from the web after the air in it has become heavily laden with moisture.

Another stream of dry air 822 can be used to flow in the opposite direction along the web to further help remove from adjacent the web the moisture vaporized by the heat treatment. The burner and blower assembly can be placed under the web 810 facing upwardly, or two such assemblies can be used, one facing down from above and the other facing up from below. Instead of or in addition to blowing air against the web, suction can be used to help such some or all of the hot combustion products and vapors along and away from the web. Air jets can also be used to move the combustion products.

Figure 26:
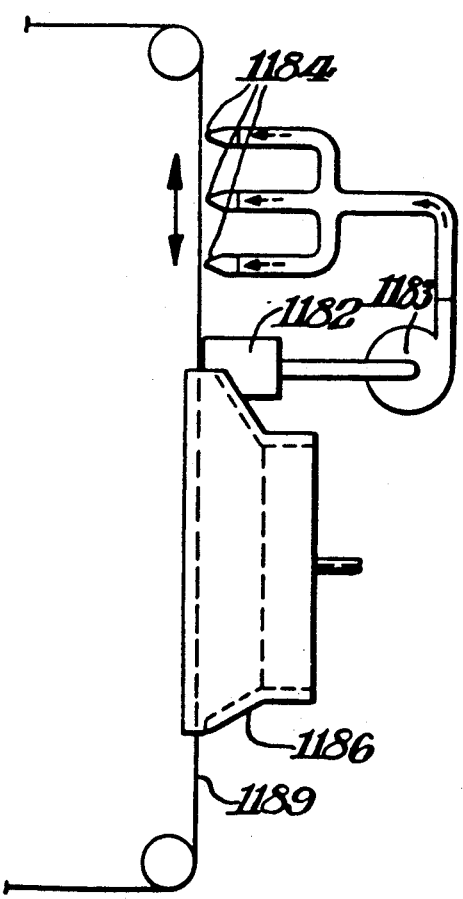

FIG. 26 illustrates a modified arrangement used to heat paper or other webs that are moving vertically rather than horizontally. In such an orientation the hot combustion gases need not flow downwardly out of the bottom edges 1186 of the burner units, so that those edges can be relatively short lengths of insulation that are horizontal or only mildly flared—about 20 to 30 degrees down from the horizontal. Those lower edges can also be brought relatively close to the moving web 1189—about ½ inch—to limit the ingress of ambient relatively cool air into the hot combustion gases.

To improve the heating effect of the hot combustion gases they are withdrawn through a top exhaust duct 1182 and propelled by a blower 1183 to jets 1184 from which those hot gases are jetted against the moving web 1189. This breaks up the boundary layer barrier of steam or the like that can be present on the web.

The burners of the present invention dry paper with particular effectiveness. The radiation they emit is about as efficient in removing the last bit of excess water from an almost bone-dry paper, as it is in removing the first bit of water from a very moist sheet, and this permits an unexpectedly sharp drop in the bulk of a paper dryer.

However, textile webs of cotton, wool, polyester, rayon, polypropylene, dacron and the like, or mixtures of such fibers, as well as plastic films are also very efficiently dried or cured with such burners.

A guide, such as plates 1129 in FIG. 22, can be used to assist with the threading of web 1110 past the burners in preparation for a drying run.

Infra-red radiation is also highly effective for preheating plastic sheets to prepare them for pressure or suction forming. Thus, a continuous sheet of polystyrene or the like can be moved in steps toward a cutting and molding press that stamps out successive suitably dimensioned portions and successively molds them into shape, with the sheet subjected to any of the irradiation arrangements described above immediately before it reaches the cutting and molding press. By making the irradiation zone equal in sheet travel length to the length of each sheet advancing step, uniform pre-heating of the sheet is obtained.

Where it is necessary to limit the amount of pre-heating so that an incandescent radiator surface must be substantially smaller than the length of an advancing step, the advancing sheet can be arranged to first advance at an uninterrupted uniform rate past a short irradiation zone, and to then be carried as by a tenter frame assembly that permits stepwise feeding to the cutting and molding press.

In the event the preheating tends to cause the plastic sheet to shrink in width or length, the heated sheet can be placed under tension, transversely or longitudinally or both. To this end a tenter frame type step advancing means can be provided with weighting rolls to apply longitudinal tension to loops of the sheet, and can additionally or alternatively be fitted with clamps that grip the side edges of the sheet and in this way apply transverse tension.

Burning a gaseous hydrocarbon fuel at the surface of a ceramic fiber matrix has been found to yield exceptionally small amounts of carbon monoxide and nitrogen oxides. Burners of this type are accordingly highly suited for industrial and domestic space heating by merely facing the incandenscent matrix toward the space and the people to be warmed. The gaseous combustion diffuse through the space being warmed, without increasing the carbon monoxide and nitrogen oxide content of the air in the space as much as it would be increased by open flames of conventional fuel-fired heaters or even cooking ranges. A matrix type space heater is accordingly very inexpensively installed. Since it is also a very effective generator of infra-red energy and warms both through such infra-red generation as well as by the heating effects of its hot combustion products, it also makes a highly efficient installation.

If desired, such a space heater can be equipped with a hood that collects its combustion products as they rise from a laterally directed vertical matrix face, for example, and vents them through a chimney or stack. Inasmuch as matrix combustion is essentially stoichiometric there is essentially no excess air in those combustion products so that the cross-sectional area of the stack or chimney can be quite small.

Figure 27:
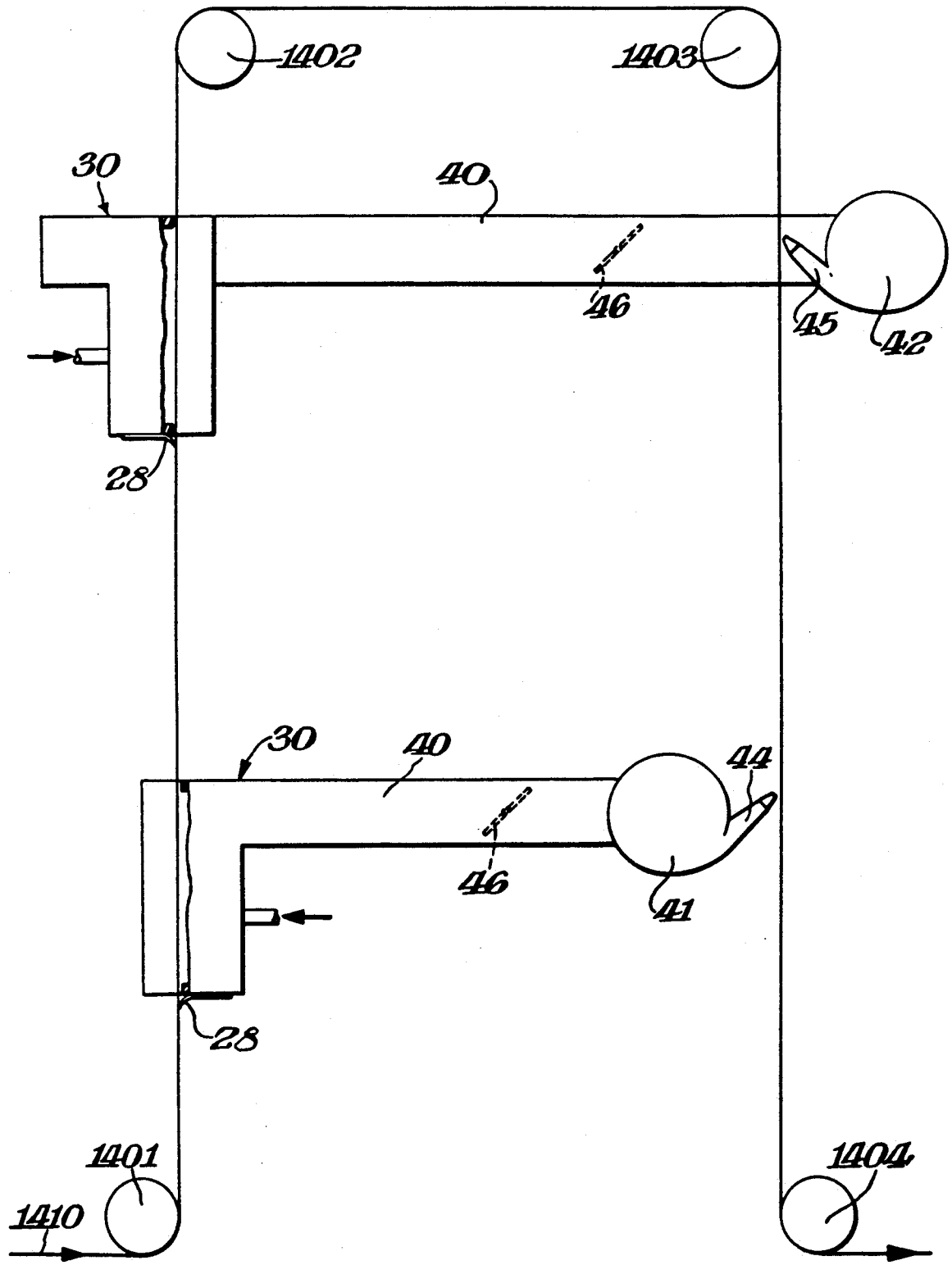

The pre-dryer of FIG. 27 has four rolls 1401, 1042, 1403 and 1404 that guide a freshly dyed textile web 1410 to a set of steam-heated drying rolls (not illustrated) where the final drying is effected. Between rolls 1401 and 1402 the web moves upwardly and in this travel each of its faces is irradiated by a heater assembly 30 illustrates in FIG. 1 of Ser. No. 186,491. Each of these assemblies has a draw-off conduit 40 through which gaseous combustion products that are still quite hot, are withdrawn. These conduits 40 lead to the intakes of blowers 41, 42 which have their discharge outlets 44, 45 directed to rapidly blow the discharged gases against the textile web as it descends between rolls 1403 and 1404.

The heater assemblies 30 can each have a scoop 28 that not only improves the drying action but also helps keep the web from fluttering as it moves upwardly. Such fluttering generally takes place, sometimes to a dangerous degree, in pre-dryers that have a substantial span between rollers 1401 and 1402.

The discharge of blowers 41 and 42 are preferably arranged to propel against the textile web, streams of hot gas in a velocity of at least about 10 linear feet per second. The velocity brings the hot streams in very good heat exchange relation with the web. The heat exchange relation is also improved by inclining the hot streams about 30 to 60 degrees upwardly. An enclosure can be provided around the downwardly moving textile web to help confine the blown streams near that web as they move upwardly alongside it.

FIG. 27 also shows an adjustment device in the form of a damper 46 in conduits 40. This damper can be opened or closed to provide the optimum drying effect. Thus the re-radiator 26 of assembly 30 will supply the best heating when it is at the highest possible temperature, and damper 46 can be adjusted while the surface temperature of the re-radiator is measured with a pyrometer. Opening the damper too wide can increase the suction in the discharge plenum 35 so much as to draw ambient air in through the re-radiator and this will cool down the re-radiator surface. On the other hand closing the damper too much reduces the volume of hot gas blown through the pump outlet. Optimum drying is generally effected when the damper is as far open as it can be set and still keep the re-radiator surface very hot.

Only one drying assembly can be used in the apparatus of FIG. 27 or conversely a large number of them can be used so that little or no steam roll drying is needed.

As shown in FIG. 28 the infra-red radiating burner 1510 can have a Bernouilli airfoil floating drying 1601 preceding it in the path through which web 1502 moves during the drying. Dryer 1601 is an elongated box that can be generally rectangular in cross-section and provided with a very narrow slot 1610 through which a steam of heated gas such as air is expelled at a velocity of ten to fourteen thousand linear feet per minute. The slot lips 1611, 1612 are shaped to divert the expelled stream at an acute angle, about 30 to 60 degrees away from the box wall 1613 that forms upstream lip 1612. At such stream velocities the stream moves along the surface of substrate 1502 and develops Bernouilli forces that urge the substrate toward, but also hold it short a fraction of an inch from wall 1613. This type of gas flow is rather turbulent and very effectively subjects the substrate to the drying action of that stream.

The gas stream for drying 1601 is preferably taken from the hot combustion products discharged by burner 1510, as by enclosing the combined dryer structure in a housing into which those gases into the interior of the box of dryer 1601.

Dryer 1601 is shown as directing its discharged stream counter-current to the movement of the substrate but can alternatively discharge its drying stream in the opposite direction so that it moves co-current with the substrate. Moreover, two or more such Bernouilli airfoil dryers can be fitted to the leading wall of burner 1510, and these can have their gas streams all directed counter-current, or all co-current, or some one way and the remainder the other.

Another Bernouilli airfoil dryer 1602 is shown as fitted to the exit end of dryer 1510 and can operate like the preceding dryer to dryers 1601. Also, the re-radiator panel 1560 can be eliminated along with its mounting structure, so that the exit Bernouilli airfoil dryer 1608 directly follows irradiating burner 1510. The Bernouilli airfoil drying combination does not require the build-up of any significant depth of hot gases under the burner matrix or under the re-radiation panel, if used.

A preferred modification of the construction of FIG. 28 is illustrated in FIG. 29. Here a set of Bernouilli airfoil guides 1603, 1604 are secured to the respective upstream and downstream ends of a burner combination 1605 containing four burners 1610, 1611, 1612 and 1613. Centrally of the burners is an exhaust gas flow-through box 1615 whose lower wall is a porous re-radiator panel 1616 corresponding to panel 414 of FIG. 11.

Airfoils 1603, 1604 are arranged to direct their discharged air streams towards the burners adjacent to them, so that they not only guide the web 1502 but also flush toward the exhaust gas flow-through box all of the hot burner combustion products along with whatever vapors are expelled from the web by the heating action. In many cases the web contains combustible solvents or the like when it enters the apparatus, and those contents are vaporized by the heating action. These vapors are kept from significant leakage to the atmosphere, and are swept toward box 1615. When those vapors are oxidizable they will be oxidized, generally by the time they reach panel 1616 so that only oxidation products are discharged from that box. The heat content of the thus-discharged products is recovered in a heat exchanger 1617 where they heat up an incoming stream of fresh air blown through by blower 1618. The resulting heated air is supplied to the airfoils 1603, 1604, and thus supplies oxygen for the oxidizing process as well as any additional heating of the web.

Skirts 1619 depending from the side edges of the burner combination 1605 help keep the airfoil discharges and burner discharges from escaping at the side edges of the web. As in the construction of FIG. 10, panel 1616 can be impregnated with oxidation catalysts such as platinum or palladium to assist with the oxidation of vapors.

FIG. 30 shows a heat-treating apparatus 10 for drying porous fabrics such as non-felted open webs of long-fibered thin sheets. Such a web 12 is delivered from a web-forming station, for example, is received on the upper run 14 of an endless conveyor belt that carries the web through a heating station defined by a burner assembly 18. Assembly 18 is a collection of gas-fired burners 20, 21, 22, 23, 24, 25, 26, 27, 28 and 29, each extending across the width of the web 12 facing downwardly to heat the web as it is carried by the conveyor. The burners can be built along the lines shown in Ser. No. 186,491, U.S. Pat. No. 4,378,207, but are mounted in pairs each pair being spaced from the next to provide gaps 31 that also extend the width of the web. A set of idler rolls 33 helps suppport the conveyor run 14, and as shown these rolls are preferably located where they do not receive the full blast of the infra-red energy generated by the burners.

Conveyor 16 is porous and is made of strands that withstand temperatures up to 400° F. or 450° F. A mesh conveyor belt can be used, but meshes of thermally resistant cords are particularly desirable since they do not carry off so much heat and the cords themselves are somewhat transmissive of infra-red energy. Also a fabric mesh conveyor is very light in weight and is much simpler to operate. Belt thickness as little as 1 millimeter are all that is needed. Aramid, qiana and other temperature-resistant fibers, tire cord grade Kevlar fibers for example, make good conveyor cords, and even nylon fibers can be used where they are not heated above about 250° F.

The conveyor face that receives web 12 is preferably coated with poly(tetrafluoroethylene) to minimize the danger of the web sticking to the upper run particularly when the web arrives in wet condition.

A series of suction boxes 41, 42, 43, 44, 45 and 46 is placed below the conveyor run 14, with their suction mouths 39 very close to or even contacting the lower face of the conveyor there. Mouths can be made of poly(tetrafluorethylene) to minimize friction. The boxes are connected to a suction manifold 37 at one or both sides of the apparatus, and these manifolds are in turn connected to a suction blower. Between the suction boxes there is fitted infra-red re-radiators which can merely be sheets 44 of thermal insulation opaque to infra-red. The upper surface of these sheets have some of the burners' infra-red energy impinged on them through the porosities in the web and in the conveyor, and those surfaces are thus heated and themselves radiate infra-red energy. That re-radiated infra-red energy helps supply additional heat to the bottom of web 12.

The fibers of which web 12 is made, may also be partly transparent to the infra-red generation, and thus permit more infra-red energy to reach the re-radiators.

The application of suction to the interiors of the suction boxes causes them to such in gas through the porosities in the web and in the conveyor. Some of the very hot gaseous combustion products discharged by the burners are thus drawn through the web to further increase the heating effect. Also where the web is wet with water or contains any other volatilizable material, the movement of the sucked gases through the web greatly increases the removal of such material.

The gaps 31 between burner pairs permit the dilution of the hot combustion products with ambient air from between the burner pairs, so that mixtures of these two gases can be sucked through the web. Such mixtures can have temperatures much lower than the undiluted combustion gases, and some webs can be damaged by such undiluted gases. At the gaps the burners can carry adjusting devices such as slides 48 that can be shifted to cover or partially cover the gaps.

The degree of suction at the suction box mouths can be selected between about 1 and about 200 inches of water column, and the burner mouths sized to cause all or only some of the hot combustion gases to be sucked through the web, with or without dilution by ambient air. To help assure that all of those hot combustion gases are available to be sucked through the web, the burners can be fitted with end skirts 50 that extend downwardly more than the side walls 52. This causes the hot combustion gases to build up under the burner face until they spill out below the bottoms of the side walls.

The conveyor strands or cords preferably provide spaces of about 1 to about 4 millimeters between them, and such openings will not have any significant effect on the manner in which the web is supported by the conveyor. The side margins 56 of the conveyor can be made with less or no inter-strand spacing, and can be completely coated to strengthen it against tearing. An impervious edge boundary so provided also helps confine the boundaries of the suction effects and reduces suction loses.

The assembly of FIG. 30 can be mounted in a framework 60 only about 18 feet long, and does a drying job about as effective as 15 steam-heated drying rolls each 5 feet in diameter. Shorter burner assemblies can be used if less drying is desired.

The individual burners 20, 21, etc. can be of the air-seal type or of the non-air-seal type, both described in Ser. No. 186,491, U.S. Pat. No. 4,378,207. Air-seal burners discharge significant amounts of air around the hot combustion gases, so that those gases are cooled somewhat by the discharged air before they flow out past side-walls 52. The air-seal flow can, if desired, be increased to the point that no additional ambient air is needed at gaps 31.

The burners are shown as of the ceramic fiber type, that is they have a porous felted ceramic fiber mat through the thickness of which is passed the gas-air combustion mixture to be burned, and the mixture burns as it emerges form the mat. This burning heats to incandescence the fibers at the face from which the combustion mixture emerges, and these incandescent fibers generate the infra-red energy which is so effective. However, other types of gas-fired infra-red burners can also be used, such as those that have ceramic plates heated to incandescence by gas flames, or those that have metal screening heated to incandescence. So-called catalytic burners are not desirable inasmuch as they are intended for operation at temperatures too low to do a good job of heating webs.

Assembly 10 may also be provided with a hood 66 that can be fitted with a blower to collect and remove combustion products and vapors. The web path in assembly 10 can be tilted rather than horizontal, so that the web moves in a direction inclined upwardly or downwardly, or even perfectly vertical.

The construction of FIG. 32 is used to help dry one or both edges of a paper web. When paper dryers are fed with undryed paper wider than preferred, the outermost few inches of the edges 1912 of the paper generally do not dry sufficiently. According to the present invention narrow burners 1900 are placed over and/or under one or both edges 1912 to more closely equalize the drying in such an installation.

In FIG. 32 two burners 1900 are shown as held on an outer carry plate 1902 that is pivoted from overhead pin 1904 by means of an elongated beam 1906, so that the burners can be pivotally retracted from the illustrated position, to simplify the threading of the paper web 1910 through the dryer. The burners are easily restored to their illustrative operation position where they are latched in place.

The fuel supply conduits to the burners 1900 are made flexible to yield with the foregoing pivotal action or the conduits can be provided with swivel joints, the swivel axes of which are aligned with pin 1904, so that the portions of the conduits secured to the burners can pivot with the burners. Where the burners have air-seal margins, a blower can be mounted on one of the burners 1900 or on carry plate 1902 or beam 1906, to supply a stream of air for the air-seals, and if desired all the air for the combustion mixtures as well.

Carry plate 1902 is also shown as holding a pad 1916 of thermal insulation such as one made of felted ceramic fibers. This pad is not needed, but if used improves the drying efficiency by acting as an absorber and re-radiator of infra-red rays. It absorbs infra-red radiation emanating from the faces of burners 1900 and its surface 1918 becomes quite hot in doing so. This hot surface re-radiates infra-red energy to the surfaces of paper edge 1912 without losing much heat by conduction to the relatively cool carry plate 1902. Pad 1916 can be grooved as shown at 1922 to permit the paper edge to completely block direct radiation from one burner face to the other.

Passageways, 1931, 1932 can be provided through the carry plate 1902 and through the pad 1916, so that the faces of the burners can be observed and thus monitored to assure proper operation. Automatic monitoring can be arranged by fitting a light or ultra-violet sensor to the passageways, and connecting them to automatically shut off all fuel flow to a burner whenever the burner face is not lit. For lighting the burners electric ignition such as shown in U.S. Pat. No. 4,157,155 can be used or, if desired, pilot flames with manual controls to override the sensors.

Groove 1922 can be flared to better permit radiation to reach the extreme margin of the paper. Burners 1900 can also be equipped with scoops and/or extensive re-radiator panels as in Ser. No. 186,491, U.S. Pat. No. 4,378,207, and/or confining boards such as 1546 in FIG. 28.

Where two burners 1900 are used at one edge of the paper, they can be located face-to-face, or they can be offset so that they do not radiate directly at each other in the event the paper web 1910 tears or its edge 1912 is damaged or missing. Such direct counter-radiation can rapidly damage the burner faces, particularly if those faces are ceramic fiber mats, and to guard against such damage a photoelectric web edge detector can be located upstream from the burners and connected to shut off the flow of fuel to one or both burners when the edge 1912 is missing from the paper web.

A similar safeguard can be used to extinguish both burners when the paper web 1910 stops or slows down excessively. Even relatively low-temperature operation of the burners can rapidly scorch a stopped paper web.

Either or both burners 1900 can also be equipped with re-radiator panels. Where so equipped the assembly of one burner with its re-radiator can be placed directly opposite a similar second assembly but with each burner directly facing the re-radiator panel portion of the opposing assembly.

Figure 33:
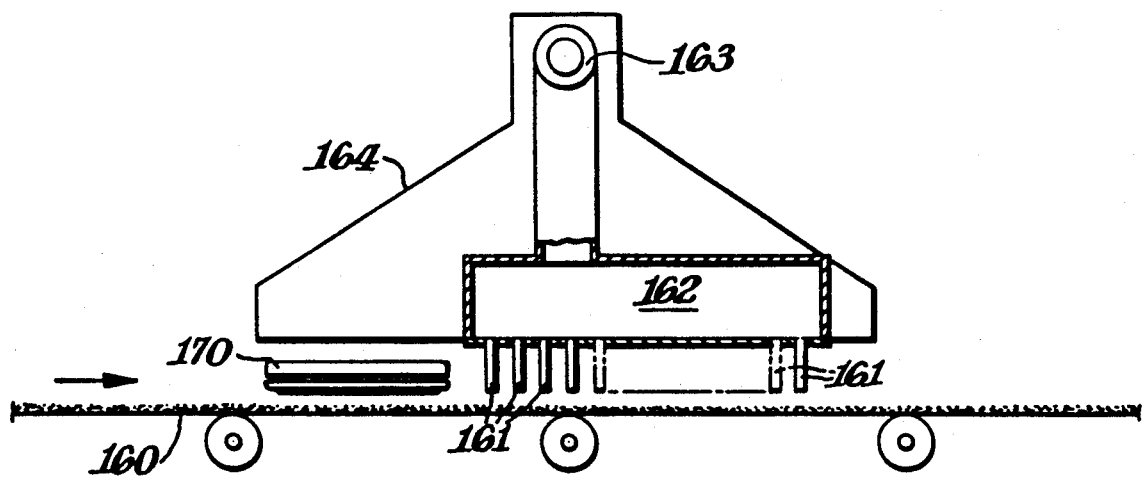

FIG. 33 also illustrates a desirable heating and drying combination of the present invention. Here a conveyor 1160, which can be of the belt of vibratory type, carries a layer of particles that are to be dried and/or heated. The layer first passes under infra-red generator 1170 which can have any of the gas-fired constructions described above or in the parent applications or can be of the ceramic tile or wire mesh type. After the infra-red generator, the particles pass under an array of tubes 1161 through which there is projected downwardly, spaced streams of heated gas. This gas comes from a manifold 1162 into which it is blown by a blower 1163. The intake of the blower is connected to two hoods, one shown at 1164 as extending along one side of burner 1170 and manifold 1162. The other hood extends similarly along the other side of those structures.

Hoods 1164 suck up the hot combustion gases generated by burner 1170, as well as the gas blown out of the bottoms of tubes 1161 after those gases have blown through the layer of particles. These sucked up gases can then be further heated by a burner upstream or downstream of blower 1163, and blown out against the layer of particles. However, if this blown out gas does not have to be as hot as, or hotter than, the hot combustion products from burner 1170, little or no auxiliary heating is needed in the sucking and blowing section. Where the blown gases cool too much in that section, a second burner 1170 can be added in front of the first burner so as to add more infra-red irradiation as well as extra heat for the blown gases.

It is not necessary to seal in the gas collection and recirculation path of the construction of FIG. 3. This simplified the construction and the sucking in of a little extra air is no significant problem.

Tubes 1161 can have their lower ends tightly or loosely fitted through holes in a horizontally-extending deflector plate. Alternatively a tube construction as in U.S. Pat. No. 4,235,591 can be used with or without the hot gas recycling of that patent. Even the blowing arrangement of U.S. Pat. No. 3,239,863, designed for dust removal, can be used to effectively blow heated gas over substrates to dry them.

FIG. 34 shows a heat-treating arrangement using an air jet arrangement to assist the heating. Here a wet paper web 1650 is passed under a gas-fired infra-red generator 1652 that can be of the air-seal or non-air-seal type and fires face down. To the downstream end of the burner is secured a box 1654, generally rectangular in cross section that can extend the full width of the burner in the direction transverse to the web movement. The downstream end of the box is closed or partially closed by an air jet duct 1656 that can be moved up and down as indicated by the double-headed arrow 1658. The lower end of the jet duct is tapered to a narrow jet nozzle 1660 that fits in and coacts with a downwardly-directed venturi 1662 whose upper end 1664 opens into box 1654, and whose lower end includes a diverter angle 1666 that splits downwardly jetted air into two streams, one directed down and upstream of the web, the other down and downstream of the web.

Box 1654 has its lower wall 1668 perforated and secured to the lower surface of that wall is a re-radiating ceramic fiber panel 1670. That panel can seal against the venturi to close off the bottom of box 1654. The top wall of the box does not reach quite as far as the jet duct 1656, leaving a gap 1672 that can be covered to varying degrees by a slide 1674.

In operation the burner is fired by a combustion mixture fed into it at arrow 1676. The hot combusted gases accumulate below the burner face and move toward the box 1654 as indicated at 1678. Air blown into jet duct 1656 as indicated at 1680 aspirated the gaseous contents of box 1654 out through the venturi 1662, thus lowering the pressure in the box and sucking the hot gaseous combustion products into the box through re-radiator panel 1670. The aspirated box contents are accordingly hot combustion products diluted with some ambient air as determined by the position of slide 1672. The jetted air also mixes with the aspirated air, and this mixture can be further adjusted by raising and lowering the jet ducts. Lowering that duct to its lower limit can bring it in contact with the venturi throat and thus essentially completely block the aspiration.

The direction of web movement can be opposite to that shown in FIG. 34, if desired. Additionally or alternatively a second burner-jet combination can be mounted downstream of the first to supplement the web treatment.

FIG. 35 illustrates a modified drying arrangement 1838 for webs 1802 of paper or textile or the like that are wet with water or other volatilizable liquid. The structure of 1838 includes a gas-fired burner 1858 having a ceramic fiber matrix 1843 the outer face of which is generally parallel to the planar irradiation zone 1844 along which web 1890 is guided by rollers 1839, 1840. The burner holds its matrix 1843 in the vertical plane, and above the burner is a porous re-radiator panel 1860 through which is sucked the hot combusted gas generated by the burner. Suction is applied from the intake 1853 of a blower 1854, and a side inlet 1852 open to a supply of ambient dry air but controlled as by damper 1851, is connected to mix such ambient air with the hot gases sucked through re-radiator 1860.

Blower 1854 propels through outlet 1855 the gases drawn through inlet 1853 and pushes those propelled gases at a pressure of at least 10 psig through a discharge slot 1847 shown as formed by a sheet metal box 1856. The slot 1847 should be about 3 to about 6 millimeters wide and should extend across the entire width of web 1891, so that it delivers a thin air curtain jet of recirculated gas directed at a speed of at least about 10 feet per second along the web surface being irradiated.

The jet should not be discharged more than about 5 millimeters from the web surface, so that the outer wall 1848 of the metal forming the jet should be quite thin—not over about 1 millimeter. This permits that wall to be spaced a few millimeters from the web. The jet can be directed parallel to the web, or it can be directed toward the web by up to about 5 degrees.

In order to reduce the burbling caused by the venturi effect of the jet, wall 1848 can have a number of small perforations that permit gas to flow at low speed from the interior of the jet forming box into the space 1846 between the web and wall 1848.

Also an additional gas discharge 1845 from blower 1854 can be directed at relatively low speed toward the web from a distance of 1 to 3 millimeters. This causes gas streams to flow both upward and downward along the web, as shown by arrows 1848, 1849. Stream 1848 also helps reduce the mixing effect of the venturi formed by jet 1847. Jet 1847 can alternatively be angled a bit so that it is directed toward the web 1891, rather than parallel to it. Thus box 1856 can be spaced about 5 to about 7 centimeters from the web, with its slot directed about 20° from parallel so that is gradually reaches the web and continues along the web in an essentially laminar flow.

By making the distance from the jet discharge to the upper end of the irradiation zone not over about 50 centimeters, the jetted air curtain will accomplish two results. It will not only rapidly flush away the vapor laden gas layer formed at the web surface by the heating effect of the irradiation, but will also keep its curtain nature and not intermix too much with the combusted gases generated by the burner. The curtain can then be collected in an exhaust box 1859 at the far end of the irradiation zone, and discharged at a location where the vapor it picks up is not returned to the web.

The temperature of the air curtain gas should not be so high as to damage the web. Where the web is paper, that temperature should be not over about 400° F. Some webs made of resin fibers will be damaged if the jet temperature is above 250° F., but high temperature webs such as those made of kevlar can withstand 450° F. jets. The jet temperature is easily controlled by adjusting damper 1851 to mix more or less cold ambient air with the recirculating hot gases.

Burner 1842 is shown as an air-seal type burner as in FIG. 10, with marginal hold-down flanges 1857 holding matrix 1843 in place. A non-air-seal type burner such as that of FIG. 23 can alternatively be used, so that no significant amount of metal is exposed to the combustion zone. Where metal is so exposed at the upper end of the burner, such metal can be covered as by extending panel 1860 downwardly to overlie the metal.

All of the 1838 equipment can be mounted on a single metal channel or plate 1858. Resilient separators as at 1882 can be inserted between adjacent metal structures that are at different temperatures in use, to reduce thermal stresses upon heat-up and cool-down.

Web 1891 can be traversed across the irradiation zone in an upward or downward or even sidewise direction. Several units 1838 can be used to treat a web, either in cascade as in FIG. 30 or in tandem to irradiate both web faces. The units can also be tilted away from the vertical.

Thus as shown in FIG. 36, a web can be threaded up and over a top roller 1888 and then down, to provide two runs 1890, 1892 against each of which an irradiating unit is installed. This triangular web run uses only a single roller 1888 that is not in line with a main set of rollers 1894, 1896, and is therefore desirable. Such a triangular arrangement is also suitable as a modification for the construction of FIG. 27, or for other treatment applications.

The construction of FIG. 35 can be varied as by eliminating the sucking of the hot combusted gases through a porous re-radiator panel. Such a variation is partly illustrated in FIG. 37. Here a web of wet paper 1990 or the like is irradiated by an irradiation unit 1938 that includes a gas-fired infra-red generator 1942 and a re-radiator panel 1960, as well as means for sweeping a stream of gas from a jet discharge 1947 to an outlet 1988. Generator 1942 can be constructed like generator 1842 in FIG. 35, and panel 1960 can be made of porous or non-porous ceramic fiber construction.

The gases emerging from outlet 1988 can be recycled by blowing them through jet 1947, preferably after they are cooled somewhat as by mixing with ambient air. Panel 1960 has its irradiating surface facing web 1990 heated by the hot combusted burner gases that move past that surface toward the outlet 1988.

The ceramic fiber mixtures for the various burner constructions of the present invention are generally long enough to span the entire width of a web that is to be irradiated, even if that web is 200 inches wide in the cross-machine direction. For web widths over about 78 inches, the matrixes are preferably pieced together as described in U.S. Pat. No. 4,224,018.

In the machine direction, the matrixes have generally been relatively short. Thus in an air-seal burner as illustrated in FIG. 10, the matrix might only have 11 inches of its machine-direction span heated to incandescence. The matrix itself could measure a total of about 14 inches in the machine direction, but 3 of those inches are covered by hold-down angles or are devoted to air-seal air discharge. The burners of the present invention preferably provide incandescent spans as large as 15 inches in the machine direction. Where a 15 inch radiant span is provided in a burner such as that of FIG. 10, the overall span of the matrix could be 3 inches greater.

About 1½ to 2 inches of the matrix's machine direction span can be devoted to a pilot compartment as illustrated in FIGS. 16 and 17. Thus in an arrangement of the type illustrated in FIG. 30, each burner can have a two-inch wide pilot combustion compartment extending across the entire cross-machine direction of the burner. A flame monitor can then be mounted at one end of the burner in alignment with the pilot compartment and oriented to respond to incandescence or flame on the matrix portion covering the cross-machine center of the pilot compartment.

The pilot compartment is more conveniently ignited as by the electric ignition of FIGS. 16 and 17, then an entire burner, and the monitor will then serve to make sure the pilot compartment is operating. In the event the monitor fails to show such operation, it automatically shuts down the entire burner, as a safety measure. However, so long as the pilot compartment operates, it can be controlled to always remain operating, whether the burner is turned up to its maximum output, or turned down or out. In such an operation the pilot compartment is arranged to be turned down to provide very little radiation, so that even though it remains operating when the balance of the burner is shut off, it will not ignite a paper web for example that may be stopped facing the operating compartment. When the burner is turned on after being turned off, the pilot compartment which can be kept on all the time will ignite the burner's combustion mixture.

To place a burner in operation, only the pilot compartment need be started, and since the pilot compartment is much smaller than the combustion mixture plenum, the start-up takes less time. Start-up also generally involves a discharge of excess combustion mixture, and such excess is much smaller for the pilot compartment than for the entire burner.

If desired, the pilot compartment can be continually maintained in operation at a very low level, whether the burner itself is turned up high or turned down low. Although this reduces the maximum radiation available from the burner, the burner controls are simplified and interruption delays reduced. Also burners are almost never used at their maximum output, and for a burner with a 15 inch radiant length in the machine direction, a 1.5 inch pilot compartment length in that direction is very minor.

The foregoing modification of FIG. 30 can be further modified as shown in FIG. 38. Here, substrate 2000 being irradiated is not very porous paper, for example, and the irradiating structure 2002 is carried by an encircling frame 2004 the interior of which can be lined with thermal insulation. The frame is open at its top and bottom, and holds a set of four burners 2011, 2012, 2013 and 2014 as well as a set of porous re-radiator panels 2021, 2022, 2023 and 2024. The burners and panels are offset from each other so that burners do not fire at each other in the event the substrate is not in place. Piping supplies combustion mixture and the like, and draws off combustion products through the re-radiator panels, but is not illustrated.

In FIG. 38 the substrate is carried through the frame from left to right, through an entrance slot 2008 and an exit slot 2009. Just before it reaches the exit slot it is subjected to gas jet curtains from jets 2031, 2032 which are directed toward the substrate and about 40 to 50 degrees upstream. This jet curtain treatment keeps the gases in the irradiation zone 2019 from escaping in any significant amounts through exit slot 2009, and can also by the jet action help suck ambient air through that slot from outside frame 2004.

The top and bottom of frame 2004 is completely filled by the burners and re-radiator panels so that the only other opening into the irradiation zone is the substrate receiving slot 2008. Vapors including solvent vapors are accordingly kept from leaking out, and any such solvent can then be recovered or burned. In order to permit simple threading of the substrate through the frame, one or both sidewalls of the frame can have side slots about 2 to 4 inches high that extend along those sidewalls and are closed as by hinged doors. Through their side slots a person's fingers can be inserted to grip and move the substrate through from entrance slot 2008 to exit slot 2009.

The apparatus of FIG. 38 is also equipped with fire-extinguishing means to prevent the spreading of a fire on the substrate. A substrate such as paper may ignite and start to rapidly burn, as for example, when a side edge tears and pushes itself against the incandescent face of a burner or when a paper substrate moving through the frame 2004 slows down to a speed low enough to permit it to be ignited by the intense irradiation. Such a slow-down is particularly apt to occur when the substrate is a web of printed paper supplied from a high-speed rotary printing press or the like, for quick drying. Problems frequently arise with the press to make slow-down necessary, and it is then much more responsive to operate the fire extinguishing of FIG. 35, rather than pull all the burners away from the paper, as suggested by the prior art.

The fire extinguisher of FIG. 38 is a pair of snuffer bars 2041, 2042 of ceramic fiber or metal held by air cylinders 2046 connected to be triggered by a flame detector to push the snuffer bars against opposite faces of the substrate to thus snuff out any fire on the moving or stationary substrate. It may be desirable to locate the snuffing zone well downstream of exit slot 2009 to make sure a detected fire does not get past the snuffing zone before the snuffer is operated.

A similar fire extinguisher can be provided near the substrate entrance slot 2008 to keep fires from travelling upstream on the substrate.

Fire extinguishing action is improved by having jets 2031, 2032 arranged to jet gas at a velocity high enough to blow out most flames, and particularly where the gas so jetted contains little or no oxygen. Such gas can be obtained from the gas withdrawn through the re-radiator panels, particularly where the burners are operated with a combustion mixture at or slightly richer than shoichiometric, and when so-called air-seal burners are used, the air for the air seals is replaced by or diluted with recycled combusted gas.

The burner matrixes are preferably impregnated with about 1% dimethylsilicone water-proofing oil, as described in Ser. No. 592,793, U.S. Pat. No. 4,654,000, to make them resistant to the action of streams of water which may reach them when they are not in use and equipment is being hosed down. Also, the matrixes can be made to operate with more uniform incandescence if they are molded from fiber slurries containing at least about 0.2% dispersing agent such as the non-ionic alkylphenylpolyethoxyethanols. The use of a fiber binder such as rubber which cures to a hydrophobic product is also helpful.

Many gases evolved from irradiated substrates are combustible and can be made to burn on surfaces through which they are sucked as at 414 in FIG. 10, to further increase the heating and curing effectiveness of the apparatus of the present invention, and at the same time reduce its environmental impact. A coating of platinum black particles can be applied to the exposed surface of 414, for example, as by spraying it with a solution of chlorplatinic acid and then heating the sprayed surface to a temperature that decomposes the chlorplatinic acid. Catalyst weights of as much as one to two grams per square foot of gross surface (as measured with a ruler) can be used. Other platinum family metals and oxidation catalysts can be substituted for the platinum. Cerium oxide and the oxides of other rare earth metals are examples of good oxidation catalysts.

The gas-fired burners of the present invention can have matrixes of varying sizes and shapes. Although for some purposes radiant faces can be only about 25 centimeters by 25 centimeters in size, the most desirable uses for gas-fired irradiators is in the larger sizes. For spanning movable webs as much as 5 meters wide, it has been previously found desirable to have a long burner with a matrix correspondingly up to about 5 meters long in the cross-machine direction, but only about 30 to 35 centimeters in the machine direction. Making a matrix much larger in the macine direction has not been desirable because the matrix is not sufficiently rigid. Thus, a conventional flat matrix board stiffened only by binders and 2.5 to 3 centimeters thick will, under the pressure of the combustion gases in the mixture plenum, deflect outward by as much as 5 or more millimeters when the matrix length and width are 50 centimeters by 100 centimeters. Such deflection is experienced whether the matrix is in an air-seal burner as in FIGS. 1, 10 and 17, or in a non-air seal burner as in FIG. 23.

The matrixes do not have much tensile or bursting strength, and can be weakened by such bellying out. In addition, the deflection adversely affects the irradiation of substrates that are located only about 3 to 5 centimeters away.

According to the present invention such deflection is securely minimized or completely prevented by the construction of FIGS. 39, 40 and 41. Here, a burner 700 has a burner body 702 to which matrix 704 is clamped by a series of clamping angles 706 secured as by bolts 708 to the burner body.

That body has a shallow sheet metal box 712 to the periphery of which is spot-welded channels 714 that have unequal arms 716, 718 that define an air-seal plenum with a discharge slot 720 extending around the entire periphery of box 712. A trough-shaped stiffener-diffuser 722 is also welded to the box 712 by the same spot welds that secure the peripheral channels 714. A series of apertures 722 in the sides of trough 720 establish passage between the inlet combustion mixture plenum section 726 above the trough, and the outlet combustion mixture plenum section 728 between the trough and the matrix 704.

As more clearly shown in FIGS. 40 and 41, the matrix has its internal surface 730 provided with a groove 732 about 7 to about 10 millimeters deep and about 3 to 4 millimeters wide. A sheet metal strip 734 has one edge inserted in the groove 732 and anchored there with adhesive 736. The strip is preferably about 1.5 millimeters thick, leaving spaces about 1 millimeter wide on each side receiving the adhesive. Through the thickness of strip 734 a series of apertures 738 are provided to provide an adhesive bridge 740 between the adhesive on the opposite sides of the strip. These apertures are preferably about 4 to about 6 millimeters wide and high, and total about 100 square millimeters per decimeter of strip length.

Strip 734 is removably secured to the trough floor 720 as by the snap fastening 744, or the similar fastenings of Ser. No. 509,161, U.S. Pat. No. 4,500,283.

As more fully shown in FIG. 40, fastening 744 consists of spring metal rounded latches 746, 748 secured to trough floor 720, that coact with latching apertures 750 in strip 734. Those apertures 750 can be made identical to the bridging apertures 738 so that the strip is symmetrical. After the strip is securely bonded in the matrix, the strip-carrying matrix can then be pushed into place, the free edge of the strip forcing its way between the spring latches, and thus latches itself in place.

The strip can also be pulled out of latching engagement by pulling out the matrix. The latches are arranged to require for disengagement a pulling force substantially greater than the bellying forces developed by the pressure in the combustion mixture plenum. About 25 pounds of disengagement force is adequate for matrixes about 50 centimeters by 100 centimeters. The strip 734 can extend across the entire span of the matrix, or can only be restricted to the center 10 or 15 centimeters of the matrix span.

All of the foregoing dimensions can be varied plus or minus 20% according to the present invention.

The most effective adhesives are elastomeric or rubbery inasmuch as they more securely adhere to the flimsy, flexible fibers of the matrix. Silicone adhesives are preferred because they are not only elastomeric when fully cured, but they are also highly resistant to the heat generated by the burner. Room temperature self-vulcanizing silicone adhesives are very effective, but silicone adhesives that need heat and/or chemical treatment for curing, can also be used. Stainless steels and polished metals might not adhere too well to silicone adhesives, so that it is preferred to make strip 734 of unpolished plain carbon or cold rolled steel. The strip can also be roughened with coarse abrasive.

Groove 732 can be cut into a finished matrix as by means of a circular saw, or it can be molded in as by providing a corresponding inset in a mold in which a slurry of the matrix-forming materials is placed and then molded.

Obviously, many modifications and variations of the present invention are possible in light of the above teachings. It is, therefore, to be understood that within the scope of the appended claims the invention may be practiced otherwise than as specifically described.

What is claimed:

1. In an infra-red generator having a ceramic fiber mat directly covering a combustion mixture plenum from which a combustion mixture is passed through the thickness of the mat to emerge from a surface on which the mixture burns to heat to incandescence the fibers on that surface, the improvement according to which the mat has an intermediate portion adhered to a metal brace connected to the back of the plenum to support the mat, and the brace is essentially a metal sheet that extends into the mat and is adheres on both sides to the adjacent surfaces of the mat.

2. The combination of claim 1 in which the portion of the metal sheet that extends into the mat is perforated and is adhered in place by adhesive that penetrates into those perforations.

3. The combination of claim 1 in which the adhesive is a rubbery adhesive.

* * * * *